(12) United States Patent
Park

(10) Patent No.: US 10,474,191 B2
(45) Date of Patent: Nov. 12, 2019

(54) WEARABLE DEVICE

(71) Applicant: Jun Ho Park, Seoul (KR)

(72) Inventor: Jun Ho Park, Seoul (KR)

(73) Assignee: MotionVirtual, Inc., San Francisco, CA (US)

(*) Notice: Subject to any disclaimer, the term of this patent is extended or adjusted under 35 U.S.C. 154(b) by 0 days.

(21) Appl. No.: 15/517,923

(22) PCT Filed: Oct. 14, 2015

(86) PCT No.: PCT/KR2015/010825
§ 371 (c)(1),
(2) Date: Apr. 7, 2017

(87) PCT Pub. No.: WO2016/060461
PCT Pub. Date: Apr. 21, 2016

(65) Prior Publication Data
US 2017/0308117 A1    Oct. 26, 2017

(30) Foreign Application Priority Data

Oct. 15, 2014  (KR) .................. 10-2014-0139081
Apr. 30, 2015  (KR) .................. 10-2015-0061522

(51) Int. Cl.
*G09G 5/00*        (2006.01)
*G06F 1/16*        (2006.01)
(Continued)

(52) U.S. Cl.
CPC .............. *G06F 1/163* (2013.01); *G06F 3/015* (2013.01); *G06F 3/017* (2013.01); *G06F 3/0304* (2013.01);
(Continued)

(58) Field of Classification Search
CPC ..... A61B 5/681; A61B 5/02438; G06F 3/017; G06F 1/163
See application file for complete search history.

(56) References Cited

U.S. PATENT DOCUMENTS 8,570,273 B1   10/2013  Smith
8,773,512 B1    7/2014  Rafii
(Continued)

FOREIGN PATENT DOCUMENTS

JP   2004255212    4/2006
JP   2006102110    4/2006
(Continued)

OTHER PUBLICATIONS

International Search Report and Written Opinion of International Application No. PCT/KR2015/010825; dated Jan. 26, 2016; 6 pages.

*Primary Examiner* — Nan-Ying Yang
(74) *Attorney, Agent, or Firm* — Perkins Coie LLP

(57) ABSTRACT

Disclosed is a wearable device. The wearable device includes an optical signal transmission unit configured to transmit optical signals, an optical signal sensing unit configured to receive reflected optical signals generated upon reflection of the optical signals by an object, a data processing unit configured to process the received reflected optical signals, and a key determination unit configured to sense a user's key input motion based on data acquired by processing the reflected optical signals and to generate an input value matching the key input motion.

18 Claims, 6 Drawing Sheets

(51) Int. Cl.
*G06K 9/00* (2006.01)
*G06F 3/01* (2006.01)
*G06F 3/03* (2006.01)

(52) U.S. Cl.
CPC ..... *G06K 9/00355* (2013.01); *G06K 9/00885* (2013.01); *G06F 2203/0331* (2013.01); *G06K 2009/00932* (2013.01)

(56) References Cited

U.S. PATENT DOCUMENTS

| | | | |
|---|---|---|---|
| 9,367,651 | B2 | 6/2016 | Algreatly |
| 9,582,076 | B2 | 2/2017 | Kienzle et al. |
| 9,760,214 | B2 | 9/2017 | Li |
| 2010/0103104 | A1 | 4/2010 | Son et al. |
| 2011/0007035 | A1 | 1/2011 | Shai |
| 2012/0075173 | A1 | 3/2012 | Ashbrook et al. |
| 2013/0346168 | A1 | 12/2013 | Zhou et al. |
| 2014/0039309 | A1 | 2/2014 | Harris et al. |
| 2014/0098018 | A1 | 4/2014 | Kim et al. |
| 2014/0135612 | A1* | 5/2014 | Yuen ........... A61B 5/02405 600/407 |
| 2014/0204191 | A1 | 7/2014 | Takai et al. |
| 2014/0278220 | A1 | 9/2014 | Yuen |
| 2015/0117708 | A1 | 4/2015 | Guigues et al. |
| 2015/0157262 | A1* | 6/2015 | Schuessler ........ A61B 5/0261 600/479 |
| 2015/0186708 | A1 | 7/2015 | Katz |
| 2015/0338916 | A1 | 11/2015 | Priyantha et al. |
| 2015/0382105 | A1* | 12/2015 | Thompson ........ A61B 5/1455 381/94.1 |
| 2016/0015470 | A1 | 1/2016 | Border |
| 2016/0124524 | A1 | 5/2016 | Zhao et al. |
| 2016/0135687 | A1 | 5/2016 | Harris et al. |
| 2017/0242496 | A1 | 8/2017 | Park |
| 2017/0308117 | A1 | 10/2017 | Park |

FOREIGN PATENT DOCUMENTS

| | | |
|---|---|---|
| JP | 2007128304 | 5/2007 |
| KR | 1020030017924 | 3/2003 |
| KR | 1020090079019 | 7/2009 |
| KR | 1020100047793 | 5/2010 |
| KR | 1020130092815 | 8/2013 |
| KR | 101310464 | 9/2013 |
| KR | 101339644 | 12/2013 |
| KR | 101360149 | 2/2014 |
| KR | 1020140062895 | 5/2014 |
| KR | 101524575 | 6/2015 |
| KR | 1020150083602 | 7/2015 |
| WO | 2016028097 | 2/2016 |
| WO | 2016060461 | 4/2016 |
| WO | 2017039225 | 3/2017 |

* cited by examiner

[Fig. 1]
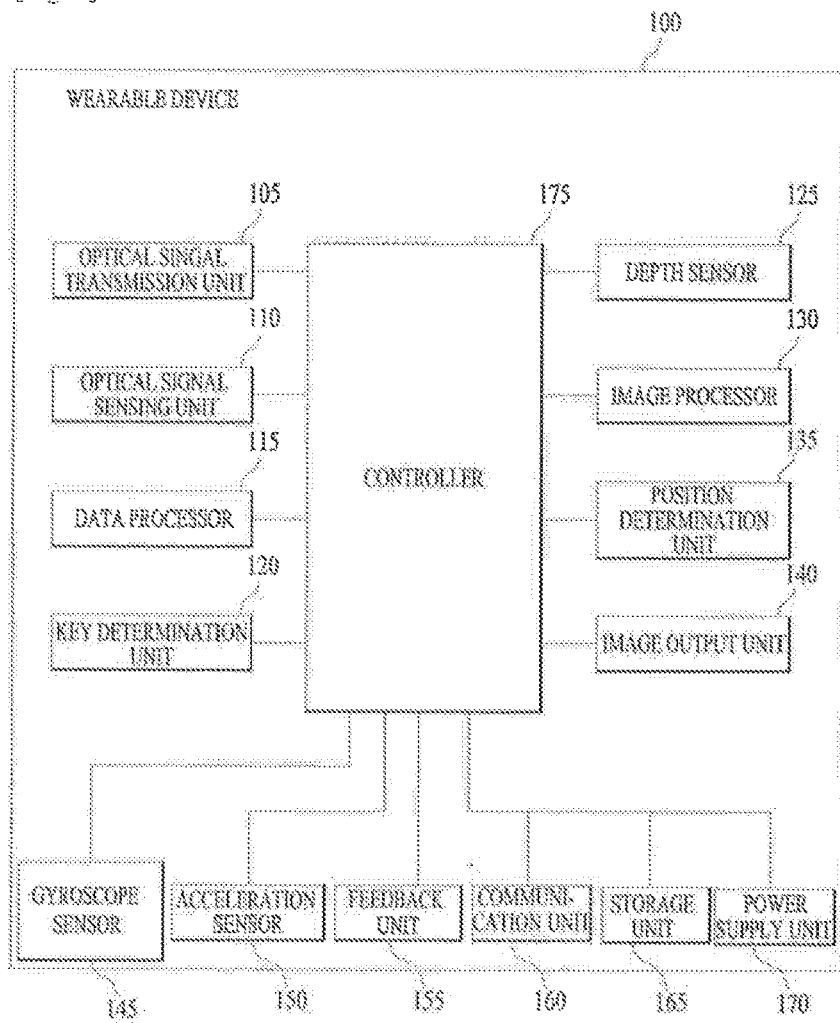
[Fig. 2]
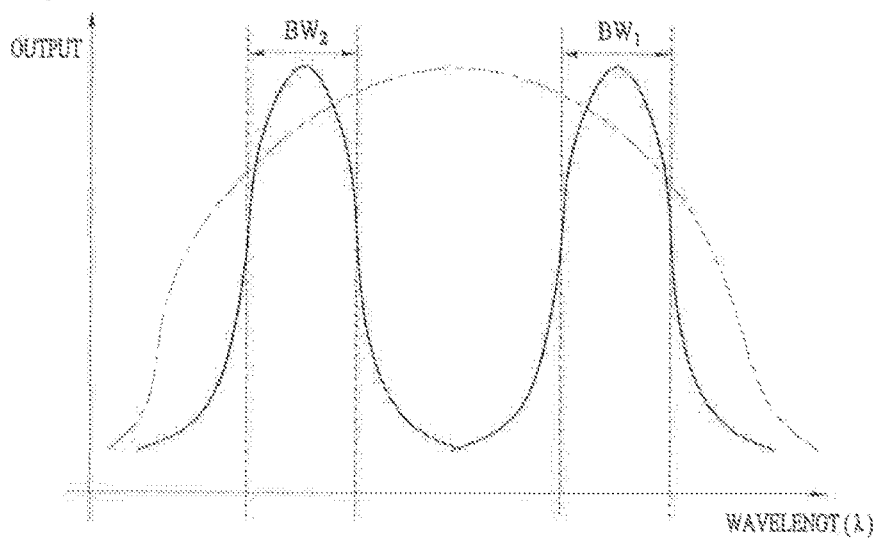

[Fig. 3]
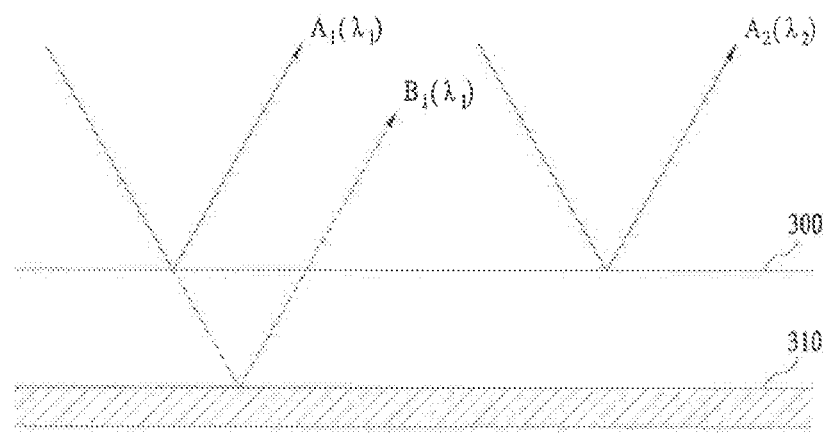
[Fig. 4]
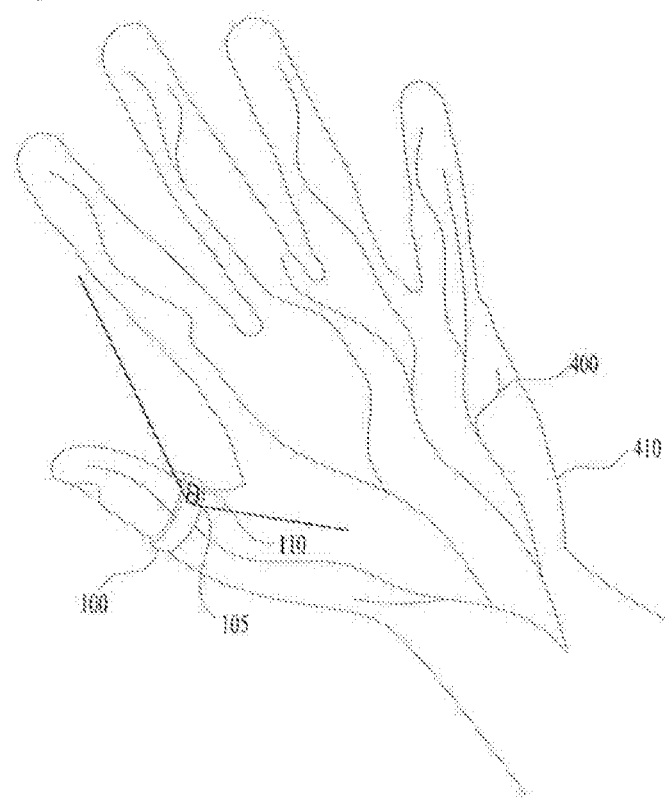

[Fig. 5]
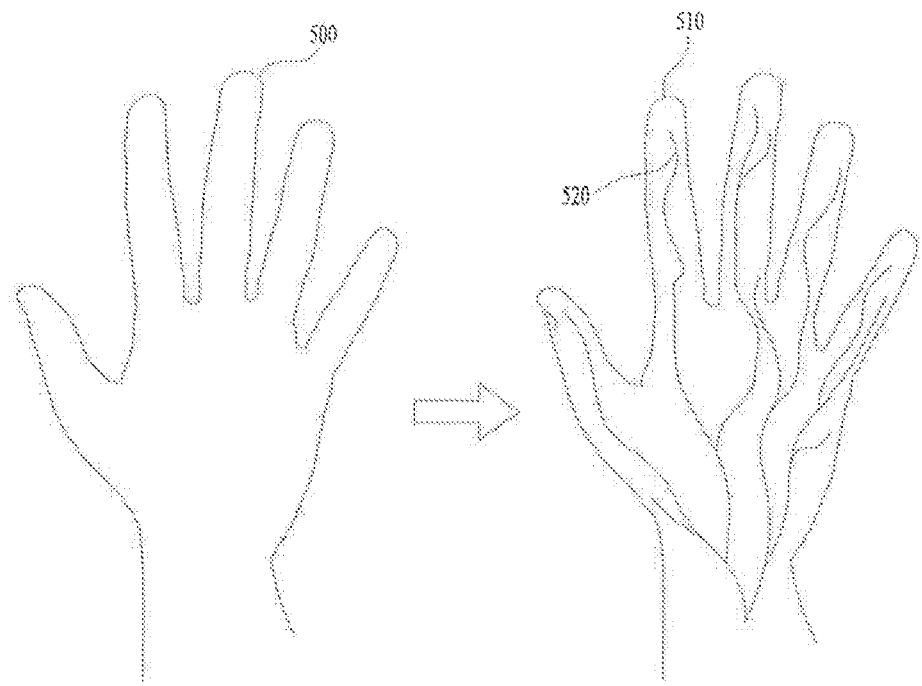
[Fig. 6]
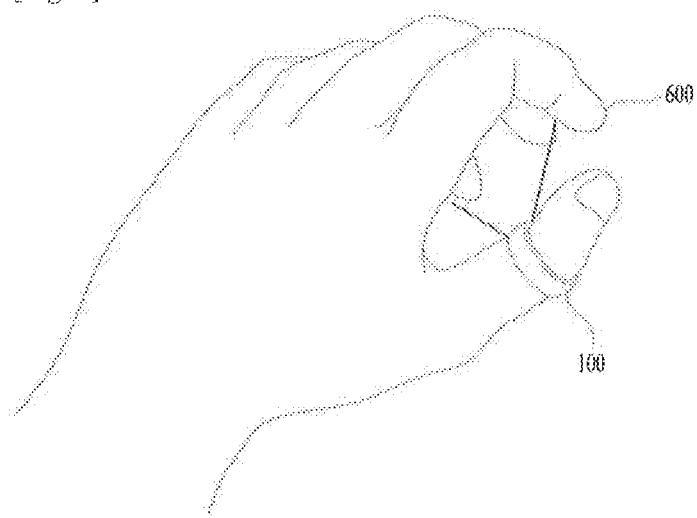

[Fig. 7]
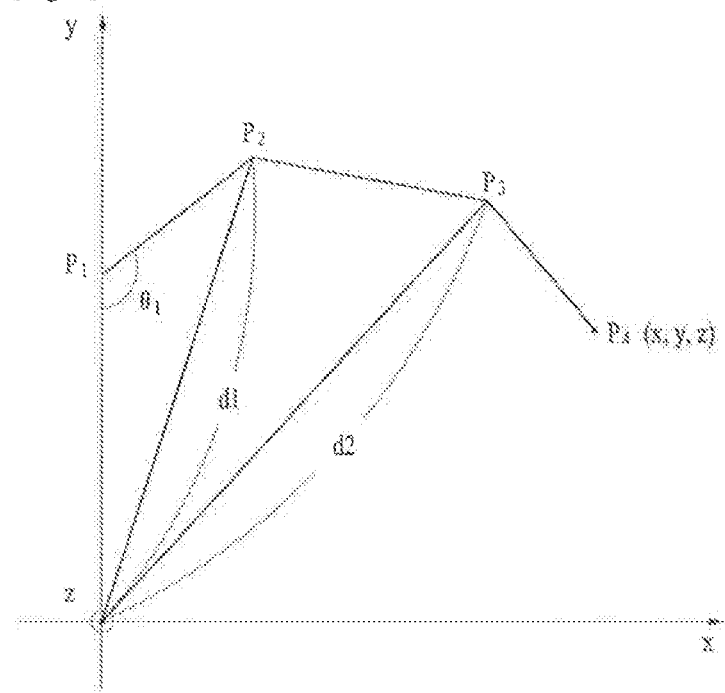
[Fig. 8]
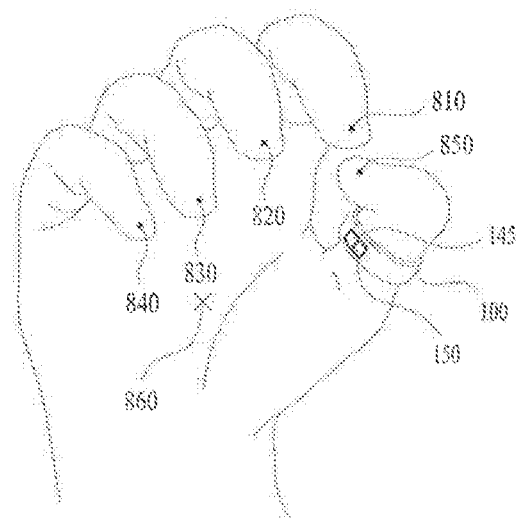

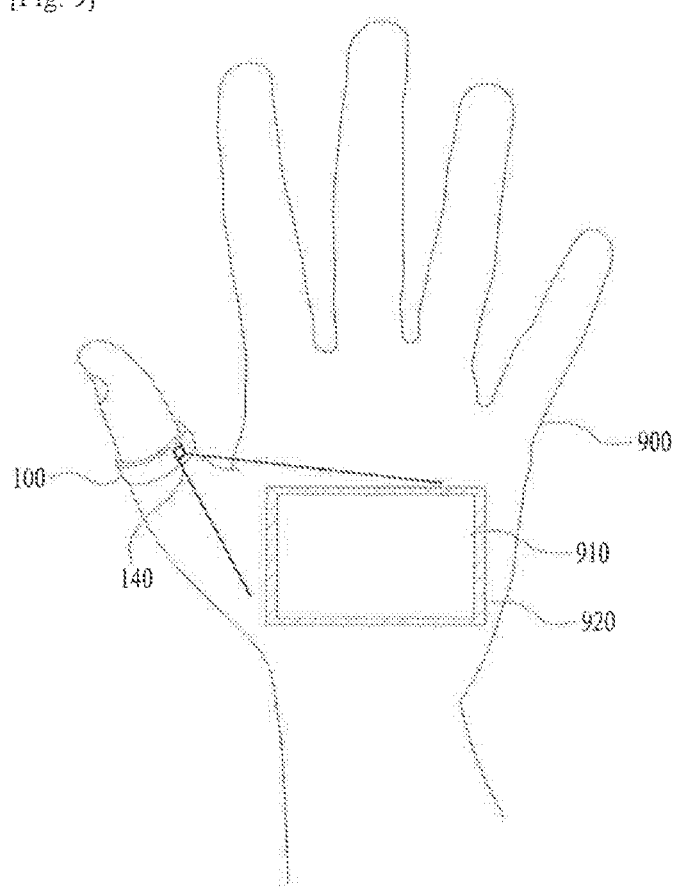
[Fig. 9]

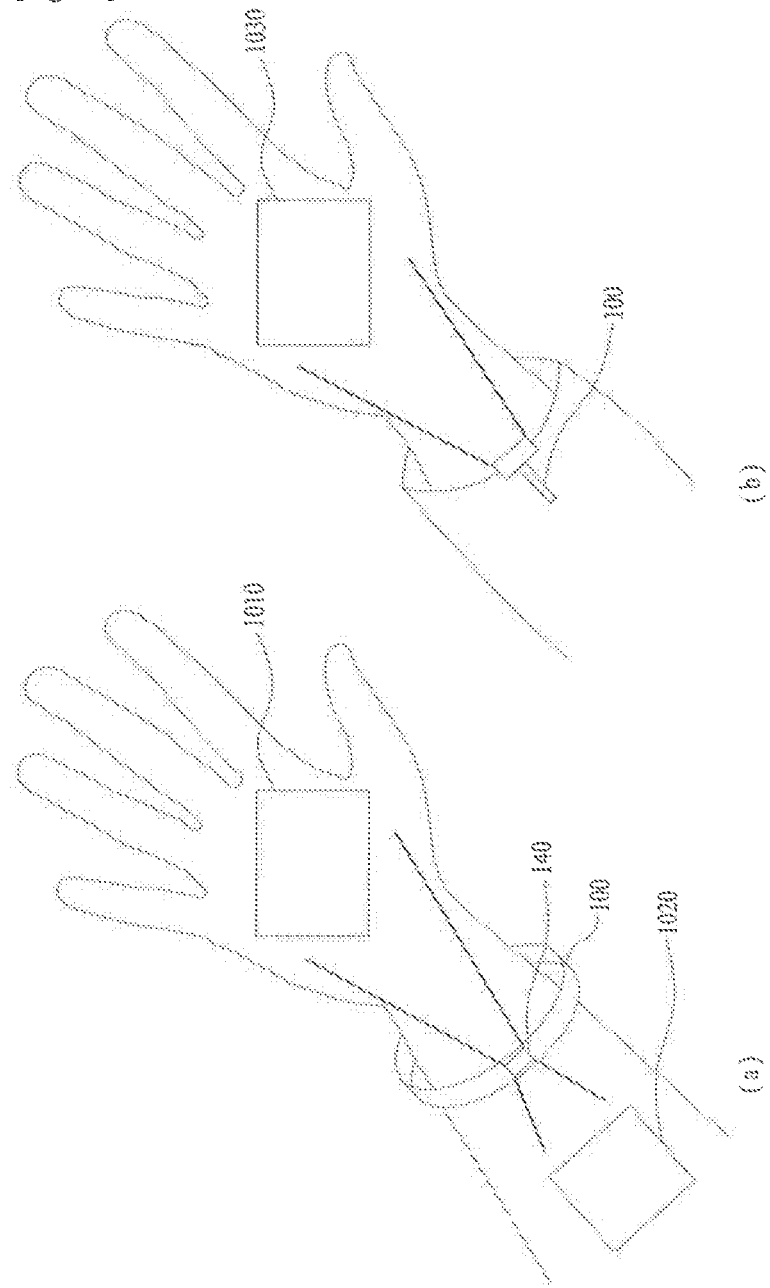

WEARABLE DEVICE

TECHNICAL FIELD

The present invention relates to a wearable device.

BACKGROUND ART

In a modern society in which use of electronic devices is essential to everyday life, electronic devices respectively include input units. However, among such general input units, 2D input units, such as a keyboard, a mouse and the like, are not greatly improved. Further, portability and convenience of the input units need to be improved.

Thereby, an input unit which may satisfy both portability and convenience is required. Particularly, in order to meet the miniaturization trend of electronic devices, a new input unit needs to process various input values so as to sufficiently use functions of electronic devices as well as to have portability and convenience.

DISCLOSURE OF INVENTION

Technical Problem

An object of the present invention is to provide a wearable device which allows a user to conveniently input data using a portable input unit.

Another object of the present invention is to provide a wearable device which allows a user to input various kinds of data so as to substitute for keyboard and mouse input units.

Yet another object of the present invention is to provide a wearable device which may maintain precision of input data as well as portability.

Technical objects to be accomplished by the present invention are not limited to the above objects, and other technical Objects which are not stated will become apparent to those skilled in the art from the embodiments of the present invention given hereinbelow.

Solution to Problem

In one embodiment of the present invention, a wearable device includes an optical signal transmission unit configured to transmit optical signals, an optical signal sensing unit configured to receive reflected optical signals generated upon reflection of the optical signals by an object, a data processing unit configured to process the received reflected optical signals, and a key determination unit configured to sense a user's key input motion based on data acquired by processing the reflected optical signals and to generate an input value matching the key input motion, wherein the optical signal transmission unit transmits a first optical signal and a second optical signal having different first and second wavelengths, the optical signal sensing unit receives a first reflected optical signal caused by the first optical signal and a second reflected optical signal caused by the second optical signal, the data processing unit generates pattern information regarding blood vessels of the object based on the first reflected optical signal and the second reflected optical signal, and the key determination unit senses the user's key input motion by comparing information regarding blood vessels changed according to the user's key input motion with the pattern information.

The data processing unit may acquire blood vessel data generated by subtracting data, acquired by processing the second reflected optical signal, data, acquired by processing the first reflected optical signal.

The data processing unit may generate the pattern information regarding blood vessels of the object using the blood vessel data.

The wearable device may further include a depth sensor configured to 3-dimensionally sense the object and to generate 3D scan information and an image processor configured to generate a 3D model of the object based on the 3D scan information and to add a pattern representing the blood vessels to the 3D model based on the pattern information.

The key determination unit may sense the user's key input motion by comparing the information regarding blood vessels changed according to the user's key input motion with the pattern added to the 3D model.

The information regarding blood vessels may be acquired by sensing the distribution of at least one of color, chroma and brightness due to the blood vessels of the object through the optical signal sensing unit.

The key determination unit may determine the 3D positions of a first joint connecting the palm of the user's hand and a first phalange of a finger and a second joint connecting the first phalange and a second phalange of the finger and generate the input value based on the 3D positions of the first joint and the second joint.

The key determination unit may determine the 3D positions of the first joint and the second joint and bending angles of the first joint and the second joint and calculate the position of the tip of the finger, the key input motion of which is sensed, according to the 3D positions and the angles of the two joints.

The optical signal sensing unit may respectively sense the first reflected optical signal and the second reflected optical signal by separating a received reflected optical signal according to wavelengths.

The optical signal sensing unit may respectively sense the first reflected optical signal and the second reflected optical signal separately received according to time domains or frequency domains.

In another embodiment of the present invention, a wearable device includes an optical signal transmission unit configured to transmit optical signals, an optical signal sensing unit configured to receive reflected optical signals generated upon reflection of the optical signals by an object, a data processing unit configured to process the received reflected optical signals, a position determination unit configured to measure the distance and angle of the wearable device with the object based on data acquired by processing the reflected optical signals, and an image output unit configured to output an image to the outside, wherein the optical signal transmission unit transmits a first optical signal and a second optical signal having different first and second wavelengths, the optical signal sensing unit receives a first reflected optical signal caused by the first optical signal and a second reflected optical signal caused by the second optical signal, the data processing unit generates pattern information regarding blood vessels of the object based on the first reflected optical signal and the second reflected optical signal, the position determination unit measures the distance and angle of the wearable device with the object by comparing the pattern information with pre-stored blood vessel information, and the image output unit outputs the image of a fixed size to a fixed position based on the distance and angle.

Advantageous Effects of Invention

Embodiments of the present invention may provide effects as below.

First, a user may execute improved data input through a wearable device which may provide both portability and convenience.

Second, the wearable device may replace a keyboard and a mouse and thus various data input may be executed using only the wearable device without any additional input unit.

Third, the wearable device may maintain precision of data input as well as portability and thus provide improved data input environment to a user.

Effects acquired by the embodiments of the present invention are not limited to the above-stated effects, and other effects which are not stated will be apparent to those skilled in the art from the embodiments of the present invention given hereinbelow. That is, effects which are not intended according to implementation of the present invention will be deduced from the embodiments of the present invention by those skilled in the art.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram illustrating configuration of a wearable device in accordance with one embodiment of the present invention;

FIG. 2 is a view illustrating an operating process of the wearable device in accordance with one embodiment of the present invention;

FIG. 3 is a view illustrating an operating process of the wearable device in accordance with one embodiment of the present invention;

FIG. 4 is a view illustrating an operating process of the wearable device in accordance with one embodiment of the present invention;

FIG. 5 is a view illustrating an operating process of the wearable device in accordance with one embodiment of the present invention;

FIG. 6 is a view illustrating an operating process of the wearable device in accordance with one embodiment of the present invention;

FIG. 7 is a view illustrating an operating process of the wearable device in accordance with one embodiment of the present invention;

FIG. 8 is a view illustrating an operating process of the wearable device in accordance with one embodiment of the present invention;

FIG. 9 is a view illustrating an operating process of the wearable device in accordance with one embodiment of the present invention; and FIGS. 10(*a*) and 10(*b*) are views illustrating implementation types of a wearable device in accordance with other embodiments of the present invention.

BEST MODE FOR CARRYING OUT THE INVENTION

The terms used in the following description are terms which are generally used at present taking into consideration the functions obtained in accordance with the present invention, and the definitions of these terms may be changed in accordance with the intention of an engineer in the art, a precedent, or advent of new technology. Further, there may be terms selected by the applicant and, in this case, these terms should be defined in the description of the present invention. Therefore, the terms used in the present invention should be defined based on the overall content of this specification.

In embodiments below, elements and features of the present invention are combined into a designated type. The respective elements or features may be selectively considered unless stated otherwise. The respective elements or features may not be combined with other elements or features. Further, some elements and/or features may be combined to produce embodiments of the present invention. A sequence of operations described in the embodiments of the present invention may be changed. Some elements or features in an embodiment may be included in any other embodiment or be replaced by corresponding elements or features of any other embodiment.

In a description of the drawings, procedures or operations which may obscure the spirit of the present invention are not described and procedures or operations which will be apparent to those skilled in the art are omitted.

In the following description of the present invention, it will be understood that the terms "comprising" and "including" do not exclude presence of one or more other elements but mean presence of the corresponding elements, unless stated otherwise. Further, the terms "part", "device" and "module" stated in the description mean a unit to process at least one function or operation and it may be implemented through combination of hardware, software, or hardware and software. Further, if it is stated in the description that an element is "connected to" another element, it may include not only physical connection but also electrical connection and further mean logical connection.

Further, "a" or "an", "one", "the" and their synonyms may indicate both singular and plural, unless stated otherwise in the description of the present invention (particularly, in the claims).

Further, a "user" in the specification may be a wearer or a user of a wearable device and include an engineer to repair the wearable device, but is not limited thereto.

Reference will now be made in detail to the preferred embodiments of the present invention, examples of which are illustrated in the accompanying drawings.

Further, Specific terms used in the embodiments of the present invention are provided only for a better understanding of the present invention and may be changed without departing from the scope and spirit of the invention as disclosed in the accompanying claims.

Hereinafter, prior to description of the embodiments of the present invention, the disclosure of Korean Patent Application No. 10-2014-0108341 and Korean Patent Application No. 10-2014-0139081 filed by the same inventor(s) and applicant of the present invention will be referred to. Korean Patent Application No. 10-2014-0108341 proposes a method for generating a 3D model by 3D scanning an object using a wearable device and then sensing movement of a user by adding a pattern to the 3D model, and Korean Patent Application No. 10-2014-0139081 proposes a method for sensing movement of a user by analyzing a blood vessel pattern of the user by transmitting/receiving and comparing optical signals having different wavelengths.

FIG. 1 is a block diagram illustrating configuration of a wearable device in accordance with one embodiment of the present invention.

FIG. 1 is a block diagram illustrating configuration of a wearable device in accordance with one embodiment of the present invention. The wearable device 100 may further include other universal elements in addition to elements shown in FIG. 1, or include a smaller number of elements than the elements shown in FIG. 1. That is, the implementation type and scope of the wearable device 100 are not limited to those shown in FIG. 1.

The wearable device 100 is an input/output unit worn on a part of a user's body (for example, a hand). The wearable device 100 senses movement of the user's body using various units and generates data and signals according to a motion formed by the sensed movement. The wearable device 100 may transmit the generated data and signals to an external device or a server and serve as an input unit of the external device.

Hereinafter, various elements of the wearable device 100 will be respectively described. The wearable device 100 in accordance with this embodiment may include an optical signal transmission unit 105, an optical signal sensing unit 110, a data processor 115, a key determination unit 120, a depth sensor 125, an image processor 130, a position determination unit 135, an image output unit 140, a gyroscope sensor 145, an acceleration sensor 150, a feedback unit 155, a communication unit 160, a storage unit 165, a power supply unit 170, and a controller 175. These elements may be connected to one another by wire or wirelessly and transmit/receive data and signals to/from one another. As described above, the elements shown in FIG. 1 are only exemplary elements to form the wearable device 100, and the wearable device 100 may include a greater or smaller number of elements than these elements.

The optical signal transmission unit 105 generates optical signals and transmits the generated optical signals. The optical signal transmission unit 105 may generate optical signals having specific wavelengths, for example, an optical signal of the wavelength of visible light (about 300 to 700 nm) or the wavelength of infrared light (about 700 to 3,000 nm). However, the wavelength band of the optical signal generated by the optical signal transmission unit 105 is not limited thereto, and the optical signal transmission unit 105 may generates optical signals of various wavelengths, such as far infrared light having a longer wavelength, in addition to near infrared light having the above-described wavelength. Differently, the optical signal transmission unit 105 may generate an optical signal of a continuous spectrum instead of generation of optical signals having specific wavelengths. A detailed description of the wavelength of the optical signal generated by the optical signal transmission unit 105 will be given later with reference to FIG. 2.

The optical signal transmission unit 105 transmits the generated optical signals. The optical signal transmission unit 105 may transmit the optical signals of a continuous wave type or transmit the optical signals of a non-continuous wave type.

Further, the optical signal transmission unit 105 may transmit an optical signal having a pattern. The pattern means a predetermined shape or type formed when the transmitted optical pattern is projected onto an external surface. For example, the optical signal transmission unit 105 may transmit an optical signal having a stripe pattern. Further, such a pattern of the optical signal may be programmed and pre-stored and an arbitrary pattern recognizable by the wearable device 100 may be used.

As described above, the optical signal transmission unit 105 generates and transmits optical signals through various methods. The optical signal transmission unit 105 may generate and transmit optical signals through various methods by combining wavelengths of optical signals, kinds of optical signals or transmission methods of optical signals. The wearable device 100 may include one or more optical transmission units 105, and a detailed description thereof will be given later in reference to FIG. 2.

The optical signal sensing unit 110 senses optical signals received from the outside. When the optical signals transmitted by the optical signal sensing unit 105 are reflected by an external object (for example, an article or a part of a human body), various physical property values, such as the intensity, wavelength, frequency hand, energy and the like of the optical signals, are changed. Hereinafter, the optical signals, the physical properties of which are changed through reflection by an external surface, are referred to as reflected optical signals. The optical signal sensing unit 110 senses reflected optical signals generated upon reflection of the optical signals by the external object.

As the optical signal transmission unit 105 transmits optical signals of various wavelengths, the optical signal sensing unit 110 may sense the optical signals of wavelengths which the optical signal transmission unit 150 may transmit. That is, the optical signal sensing unit 110 may sense an optical signal of a visible light wavelength, an optical signal of a near infrared light wavelength, an optical signal of a far infrared light wavelength and the like, and the wavelength detected by the optical signal sensing unit 110 is not limited to such exemplary bands similarly to the above description.

The data processor 115 processes the optical signals received by the optical signal sensing unit 110 and generates reception data. A data processing procedure by the data processor 115 may include a process of digitalizing analog signals, i.e., the optical signals received by the optical sensing unit 110. A process of generating the reception data through data processing may be carried out at constant periods or carried out according to control instructions from the controller 175 of the wearable device 100.

If the Object is a part of a human body, the reception data generated by the data processor 115 may include information regarding blood vessels of the object. That is, as will be described later in detail, the optical signals transmitted by the optical signal transmission unit 105 are reflected, scattered and absorbed by blood vessels of the object and thus, physical property values of the optical signals are changed. Thereby, the data processor 115 may acquire information of arrangement and distribution of the blood vessels of the object by processing the reflected optical signals received by the optical signal sensing unit 110. Hereinafter, among the above-described reception data, reception data if the object is blood vessels will be referred to as blood vessel data for convenience of description.

As described above, when the optical signal transmission unit 105, the optical signal sensing unit 110 and the data processor 115 sense blood vessels and generate blood vessel data, the depth sensor 125, which will be described later, may be operated together. Although this will be described in detail, the depth sensor 125 may 3-dimensionally sense an object and thus sense the 3D structure, shape, position and the like of the object. Therefore, blood vessel data regarding the sensed blood vessels may include 2D information regarding the distribution and arrangement of the blood vessels and blood vessel data acquired by operating the depth sensor 125 together with the optical signal transmission unit 105, the optical signal sensing unit 110 and the data processor 115 may include 3D information.

The key determination unit 120 senses a user's key input motion and generates an input value matching the key input motion. The key input motion means a motion in which a user wearing the wearable device 100 presses a designated key on a virtual keyboard. That is, although there is no actual keyboard, a user wearing the wearable device 100 may perform a Motion of pressing a key and such a motion means the key input motion. The key input motion may mean a motion in which a user's finger contacts or presses a designated surface and, in this case, the user's finger may contact an object, such as a part of the user's body (for example, another finger or the palm of the hand) or an external article. Further, the key input motion may include all cases that the finger is bent at a designated angle or more although the finger does not contact the external surface. That is, a case that the finger performs a motion similar to contact with the external surface although the finger does not contact the external surface may correspond to the key input motion.

The key determination unit 120 may sense the key input motion performed by the user using the reception data generated by the data processor 115. In more detail, the reception data includes information regarding blood vessels, as described above. Thereby, when the key determination unit 120 senses the arrangement and distribution of the blood vessels according to the user's key input motion, the key determination unit 120 compares the sensed information regarding blood vessels with pre-stored data regarding blood vessels. Such a comparison process may be carried out by comparing change of at least one of color, chroma, brightness, size and shape due to the arrangement and distribution of the blood vessels.

The key comparison unit 120 may detect a key to which the user's key input motion corresponds according to a result of comparison. That is, the key comparison unit 120 generates an input value by comparing information regarding blood vessel sensed according to the key input motion with pre-stored information, and a detailed description thereof will be given later.

The generated input value is a value representing which key corresponds to the user's key input motion and may be processed at the inside of the wearable device 100 or transmitted to an external device connected to the wearable device 100 or the server.

The depth sensor 125 3-dimensionally scans the object and generates 3D scan information, That is, the depth sensor 125 transmits various kinds of signals to the object and senses change of the signals transmitted from the surface of the object or senses signals reflected by the object. The depth sensor 125 may analyze the sensed signals and generate 3D scan information of the object. For example, if the object is a user's hand, the depth sensor 125 may 3-dimensionally sense the user's hand and generate 3D scan information of the external appearance of the user's hand.

The depth sensor 125 serving to 3-dimensionally scan the object may include various kinds of sensors or devices. For example, the depth sensor 125 may include an infrared camera which transmits an infrared signal to an object and senses change of the signal by the surface of the object, a Time of Flight (ToF) camera which transmits an ultrasonic signal or an optical signal to an object and measures a time difference with a signal reflected by the object, a laser transceiver which transmits a laser signal to the object and senses a signal reflected by the object, and a stereo camera which analyzes a difference between values acquired by photographing an object from two positions.

Further, a LIght Detection And Ranging (LIDAR) method in which pulse laser light is radiated into the atmosphere and then a reflective body or a scattering body thereof is used, a speckle interferometry method in which change of a pattern of coherent light reflected by the surface of an object is used, an infrared proximity array (IPA) sensing method using two LEDs, and an RGB camera may be employed to implement the depth sensor 125.

If the depth sensor 125 generates 3D scan information using a patterned optical signal of a specific wavelength, the depth sensor 125 may have the same configuration as the above-described optical signal transmission unit 105. That is, the optical signal transmission unit 105 may use the patterned optical signal both to sense blood vessels and to generate 3D scan information. In this case, the optical signal transmission unit 105 may Output the patterned optical signal in addition to output of optical signals having different wavelengths, thus being capable of serving as the depth sensor 125 or serving as only the depth sensor 125. As the patterned optical signal output by the optical signal transmission unit 105 so that the optical signal transmission unit 105 serves as the depth sensor 125, one of the wavelengths of the optical signals to sense blood vessels may be used or an optical signal of another wavelength may be used.

Further, the depth sensor 125 may be operated through two methods, similarly to the description of the optical signal transmission unit 150, and generate scan information, That is, when the depth sensor 125 transmits an optical signal (a patterned optical signal) to the object and generates 3D scan information, the depth sensor 125 may foreknow or may not know the time and frequency band of a received optical signal. In more detail, if the depth sensor 125 foreknows the time and wavelength band (or, the frequency band) of a transmitted optical signal, the depth sensor 125 calculates a time when the corresponding optical signal will be received in advance and generates 3D scan information through the received optical signal of the calculated frequency band at the calculated time. In this case, while the optical signal transmission unit 105 transmits optical signals of specific wavelengths so as to acquire information regarding blood vessels of the object, the depth sensor 125 may transmit an optical signal to generate 3D scan information.

On the other hand, although the depth sensor 125 does not know information regarding the received optical signal, if the depth sensor 125 includes a unit to selectively sense the received optical signal, the depth sensor 125 may generate 3D scan information. That is, the depth sensor 125 may include a filter to detect a specific wavelength band of the optical signal and, in this case, selectively sense the received optical signal.

The depth sensor 125 to 3-dimensionally scan an object is not limited to the embodiment having the above-described elements but may include various other elements. Further, the depth sensor 125 may include a combination of two or more of the above-described elements.

Further, after the depth sensor 125 performs the process of 3-dimensionally scanning the object, the depth sensor 125 may improve precision of 3D scan information using computer vision technique. The computer vision technique is used to improve precision of depth information during a process of interpreting a 3D image and includes a depth-from-focus method, a depth-from-stereo method, a depth-from-shape method, a depth-from-motion method and the like. The depth sensor 125 may precisely generate 3D scan information of the object using the above-described various methods.

Although the above description exemplarily states the case that the object is a part of a user's body, such as a hand, the disclosure is not limited thereto. That is, the object may mean not only a part of a human body but also an article, a space or a structure. For example, if the object is an article, such as a portable terminal, a notebook, or a desk, the depth sensor 125 may 3-dimensionally scan the portable terminal, the notebook, or the desk and generate 3D scan information. Further, if the wearable device 100 is located within a room, the depth sensor 125 may scan a space and walls within the room as the object. Thereby, the depth sensor 125 may recognize a 3D space by the walls of the room and generate 3D scan information of the walls. In this case, the depth sensor 125 may detect the position of the wearable device 100 within the room, i.e., the absolute coordinates of the wearable device 100 within a designated space.

The image processor 130 is connected to the depth sensor 125 and receives and processes the 3D scan information, in more detail, the image processor 130 may generate a 3D image using the 3D scan information received from the depth sensor 125 and generate a 3D model of the object through a 3D rendering process. As one example, if the object is a user's hand, when the depth sensor 125 senses the user's hand, the image processor 130 may generate a 3D model of the hand. As another example, if the object is an article, such as a portable phone, the image processor 130 may generate a 3D model of the portable phone. The 3D model may be expressed in black/white or color.

Further, the image processor 130 may add a pattern of blood vessels to the generated 3D model using the reception data generated by the data processor 115. As described above, the data processor 115 processes the optical signals received by the optical signal sensing unit 110 and generates information regarding blood vessels of the object. The image processor 130 may process the information regarding blood vessels, generate a visually confirmable pattern, and add the generated pattern to the 3D model generated based on the 3D scan information. That is, the image processor 130 may generate a 3D model formed by mapping the pattern regarding blood vessels onto the 3D model representing only the external appearance of the object.

During a process of generating the input value by comparing the information regarding blood vessels with pre-stored information, the key determination unit 120 may analyze the pattern of the 3D model generated by the image processor 130. That is, the key determination unit 120 may detect which input value matches the user's key input motion by comparing the sensed information regarding the pattern with information regarding the pattern of blood vessels added to the 3D model.

The position determination unit 135 determines the distance and tilt angle of the wearable device 100 from an external reference point. When the data processor 115 generates the reception data including the information regarding blood vessels, as described above, the position determination unit 135 detects a separation distance of the wearable device 100 from a designated external reference point (for example, the object) and a tilt angle of the wearable device 100 from the external reference point by analyzing the reception data. Similarly to the process of generating the input value according to the key input motion through the key determination unit 120, such a process may be performed by comparing the sensed reception data with the pre-stored information regarding blood vessels. Otherwise, the position determination unit 135 may determine the distance and angle of the wearable device 100 from the external reference point by comparing the reception data with the 3D model to which the Pattern of blood vessels is added.

Otherwise, the position determination unit 135 may detect the position and distance of the wearable device 100 from the object using the above-described depth sensor 125. That is, the position determination unit 135 may detect the distance and distance of the wearable device 100 from the object by analyzing the 3D model of the object, generated by the depth sensor 125 and stored, and the sensed external appearance of the object. As another example, the position determination unit 135 may detect the position of the wearable device 100 from the object using the gyroscope sensor 145 and the acceleration sensor 150, which will be described later.

The image output unit 140 projects an image to the outside. The image output unit 140 may project an image onto an object, such as an article or a part of a human body, and the object is not limited thereto. For example, the image output unit 140 may project an image onto a part of a human body, such as the palm of a hand, the back of a hand or an arm, or project an image onto an article, such as a desk or a wall. The image projected by the image output unit 140 may include all kinds of images, i.e., an arbitrary image, a moving picture, a 3D image (stereoscopic image) and the like.

The image output unit 140 may use information determined by the position determination unit 135 during such an image projection process. In more detail, although the wearable device 100 moves, the image output unit 140 may project an output image to a designated position so as to have a designated size using results of the distance and angle of the wearable device 100 from the object measured by the position determination unit 135. That is, the position determination unit 135 calculates a distance thereof from an external reference point (for example, the object onto which the image is projected) and an angle thereof from the external reference point by measuring and analyzing movement of the position determination unit 135 in a 3D space. Thereafter, the image output unit 140 may change the output angle and position of the image so that the image may be regularly projected, in consideration of the calculated distance and angle.

Otherwise, the image output unit 140 may consider information regarding user's skin lines during a process of projecting an image. That is, the image output unit 140 may use information regarding user's skin lines (or palm lines) acquired through various methods and thus output an image to a fixed position at a fixed angle based on the skin lines. By combining this embodiment with the earlier embodiment in which the position determination unit 135 uses information regarding blood vessels, the angle and position of the image output from the image output unit 140 may be more effectively fixed.

In order to consider the above-described information regarding skin lines, the wearable device 100 may detect and manage biometric information, such as user's skin lines, in advance. That is, as described above in Korean Patent Application No. 10-2014-0108341, the wearable device 100 senses user's skin lines through a finger recognition unit including an infrared camera, an RGB camera or a ToF camera. Information regarding the sensed skin lines is processed as information regarding a skin line pattern and is stored and managed in the wearable device 100. Thereafter, the wearable device 100 may sense user's skin lines during a process of projecting an image and analyze the sensed skin lines through comparison between the sensed skin lines and the stored information regarding a skin line pattern. The wearable device 100 may detect the position and movement of a part of a user's body through such a process and output an image to a fixed position at a fixed angle, as described above.

Although the above description states that the optical signal transmission unit 105 and the image output unit 140 are separately provided, two elements may be combined into one unit. That is, the optical signal transmission unit 105 may not only transmit optical signals of various wavelengths but also transmit an image output from the wearable device 100. Such processes may be alternately carried out. That is, the optical signal transmission unit 105 configured to serve as the image output unit 140 may output an image periodically or aperiodically between alternate output of optical signals of different wavelengths. If optical signals to sense blood vessels are output during output of an image, the image may be applied to the above-described process of selectively detecting an optical signal of a specific wavelength. That is, since the image processor outputs an image of a visible light wavelength visually recognizable by a user, the optical signal of the visible light wavelength output by the image processor is used as one of optical signals to sense blood vessels. Thereby, only if the optical signal transmission unit 105 further transmits only an optical signal of an infrared light wavelength, the optical signal transmission unit 105 may acquire the same/similar effects as/to transmission of two optical signals of different wavelengths.

That is, the optical signal transmission unit 105 may sequentially repeat output of a first optical signal, output of a second optical signal and output of an image and output of the optical signals may be carried out for a shorter time than output of the image. In this case, the user may not sufficiently visually recognize the optical signals output for a short time but may confirm only the image.

Configuration of the optical signal transmission unit 105 and the depth sensor 125 into one unit has been described above. That is, if the optical signal transmission unit 105 performs the function of the depth sensor 125 and the function of the image output unit 140, the three elements may be combined into one unit. In this embodiment, the optical signal transmission unit 105 may transmit a patterned optical signal in addition to transmission of optical signals during output of the image, thus being capable of performing the depth sensor 125.

The gyroscope sensor 145 measures an angular velocity and thus senses the tilt of the wearable device 100. Kinds and functions of gyroscope sensors will be apparent to those skilled in the art and a detailed description thereof will thus be omitted. The acceleration sensor 150 may measure change of a velocity and thus sense the acceleration and tilt of the wearable device 100. Also, kinds and functions of gyroscope sensors will be apparent to those skilled in the art and a detailed description thereof will thus be omitted.

The gyroscope sensor 145 and the acceleration sensor 150 measure movement of the wearable device 100 in a 3D space. That is, the gyroscope sensor 145 and the acceleration sensor 150 sense the mouse input motion by measuring the moving direction, velocity and tilt of the wearable device 100 in the 3D space. The mouse input motion may mean input in which a user wearing the wearable device 100 moves the wearable device 100 in the space to operate the cursor of a mouse. The above-described key determination unit 120 may sense movement of the wearable device 100 in the space using the values sensed by the gyroscope sensor 145 and the acceleration sensor 150 and generate a cursor value matching the mouse input motion.

That is, the wearable device 100 may serve as a "spatial mouse" which transmits the cursor value to the outside and serves as an input device. Further, the wearable device 100 may generate a 3D model of a human body or an external object using the above-described depth sensor 125 and thus serve as a spatial mouse for the human body or the external object.

Further, a mouse click motion in connection with a mouse input motion will be described. A mouse click motion means input in which, while a user wearing the wearable device 100 performs a mouse input motion, the user clicks a left or right button of the mouse by contact of two or more fingers. For example, the wearable device 100 may recognize a case that the thumb and forefinger of a user's hand contact each other as a mouse click motion of the left button of the mouse and recognize a case that the middle finger and thumb of the user's hand contact each other as a mouse click motion of the right button of the mouse. A mouse click value corresponding to the click motion may be generated and transmitted to an external device or the server.

The feedback unit 155 is a unit to transmit tactile feedback to a user using various units. In various cases, the tactile feedback may be generated and transmitted to the user. For example, if the wearable device 100 is located at specific coordinates in a space or passes through the corresponding coordinates, and if a signal indicating transmission of the tactile feedback to the user is received from a content reproduced in an external device connected to the wearable device 100, the tactile feedback may be provided to the user.

The feedback unit 155 may transmit the tactile feedback to the user through various units. For example, the feedback unit 155 may include a vibration module to transmit a vibration signal to a user or include a pressure module so that a user wearing the wearable device 100 may feel pressure. Further, the feedback unit 155 may provide the tactile feedback to the user through a shear stress module or transmit microcurrent, which does not influence a user's body, through a current module.

The communication unit 160 executes data communication and transmission and reception of signals with the outside. For example, the communication unit 160 may be connected to an external network wirelessly, communicate with an external device or the server, and include one or more communication modules for communication.

The communication unit 160 may include modules to execute a communication function, such as wireless LAN, Wi-Fi, Bluetooth, ZigBee, Wi-Fi Direct (WFD), Ultra Wide-Band (UWB), Infrared Data Association (IrDA), Bluetooth Low Energy, and Near Field Communication (NFC) modules, as modules for short range communication.

The communication unit 160 may transmit the input value, the cursor value, the click value and the like generated by the key determination unit 120 to the outside using the above-described communication modules. Further, the communication unit 160 may receive 3D position information from an external device using the above-described communication modules.

The storage unit 165 may store data and information input to and output from the wearable device 100. For example, the storage unit 165 may store the input value, the cursor value and the click value generated by the key determination unit 120. Further, the storage unit 165 may store various kinds of program data or algorithm data executable by the wearable device 100.

The storage unit 165 may include at least one storage medium of a flash memory type, a multimedia card micro type, a card type memory (for example, an SD or XD memory), a Random Access Memory (RAM), a Static Random Access Memory (SRAM), a Read-Only Memory (ROM), an Electrically Erasable Programmable Read-Only Memory (EEPROM) and a Programmable Read-Only Memory (PROM). Further, the wearable device 100 may use web storage or a cloud server which performs the storage function of the storage unit 165 over the Internet.

The power supply unit 170 supplies power to drive the wearable device 100. The power supply unit 170 may include various kinds of power supply units, such as a Li-ion battery, a Li-polymer battery and the like, and the wearable device 100 may include a plurality of power supply units 200. The power supply unit 170 may be connected to other elements of the wearable device 100 by wire so as to supply power to the wearable device 100 and be charged by external power received wirelessly through wireless power transmission. Further, the power supply unit 170 may include a flexible battery which may be bent or spread to a designated degree or more.

The controller 175 is connected to the above-described elements and controls the overall operation of the wearable device 100. For example, when the optical signal transmission unit 105 transmits optical signals and the optical signal sensing unit 110 senses reflected optical signals, the controller 15 may control the data processor 115 so as to process the reflected optical signals and generate reception data. Further, the controller 175 may control the key determination unit 120 so as to generate an input value based on the reception data. Further, the controller 175 may control the image processor 130 so as to output an image of a fixed size to a fixed position using the position determination unit 135 or control the image processor 130 so as to generate a 3D model to assist the functions of the key determination unit 120 and the image output unit 140. That is, the controller 175 may control various functions allowing the wearable device 100 to be operated as an input unit or an output unit according to user's motions.

Hereinafter, an embodiment in which the wearable device 100 is operated according to movement of a user's body will be described. Hereinafter, a wearable device which is worn on a user's thumb into a ring type will be described unless there is a specific statement. The ring type wearable device 100 may be worn on a user's left or right hand or user's both hands, and this may be implemented through simple change of design and structure. The wearable device 100 may be implemented as various types, such as a glove type, a bracelet type and a clip type in addition to the ring type, and detailed examples thereof will be described later with reference to FIG. 10.

Further, the wearable device 100 may be implemented as a separated type into two or more pieces. That is, the elements shown in FIG. 1 may be included in any one piece or two or more pieces of the wearable device 100 and the two or more pieces of the wearable device 100 may transmit and receive data by interworking with each other. That is, the wearable device 100 may include some or all of the elements shown in FIG. 1 and, if the wearable device 100 includes some of the elements, the wearable device 100 may be operated in cooperation with another wearable device 100 including other elements.

FIG. 2 is a view illustrating an operating process of the wearable device in accordance with one embodiment of the present invention. A graph shown in FIG. 2 represents outputs of optical signals transmitted by the wearable device according to wavelength hands.

As described above, the wearable device may generate optical signals of various wavelengths and transmit the generated optical signals. Hereinafter, a process of transmitting two optical signals of different wavelengths through the wearable device in accordance with the embodiment of the present invention will be described. For convenience of description, the wavelengths of the two optical signals may be respectively referred to as first and second wavelengths, the first wavelength may mean a wavelength within a first frequency band (BW1), and the second wavelength may mean a wavelength within a second frequency band (BW2). As one example, the first frequency band (BW1) may be the frequency band of near infrared light and the second frequency band (BW2) may be the frequency band of visible light. That is, the wearable device may generate and transmit the first optical signal having the first wavelength of near infrared light and the second optical signal having the second wavelength of visible light. As another example, the first frequency band (BW1) and the second frequency band (BW2) may be frequency bands of near infrared light. That is, the wearable device may generate and transmit two optical signals having near infrared light wavelengths.

In order to output the first optical signal and the second optical signal, the wearable device may generate an optical signal having the wavelength of a continuous spectrum or generate optical signals having respective wavelengths or wavelength bands. In more detail, the wearable device may respectively generate a first optical signal and a second optical signal having different wavelengths, as shown by a solid line of FIG. 2. On the other hand, the wearable device may generate an optical signal having the wavelength of a relatively broad continuous spectrum, as shown by a dotted line of FIG. 2, and output optical signals having a first wavelength and a second wavelength using a designated filter (for example, a hand pass filter).

In the former case, the wearable device may include only one optical signal transmission unit to generate the two optical signals or include two or more optical signal transmission units to respectively generate the two optical signals having different wavelengths. In the latter case, the wearable device may include a single optical signal transmission unit or include two or more optical signal transmission units.

FIG. 3 is a view illustrating an operating process of the wearable device in accordance with one embodiment of the present invention. FIG. 3 illustrates a process in which, if the object is a human body, the wearable device transmits optical signals and senses reflected optical signals. In FIG. 3, the object 300, which is a human body, may be, for example, the skin of a hand, and a shaded part in the object 300 may be a blood vessel 310 within the human body.

First, as described in FIG. 2, the wearable device generates and transmits two or more optical signals having different wavelengths. In the embodiment of FIG. 3, A1 and B1 having a wavelength λ1 represent a first optical signal transmitted by the wearable device, and A2, having a wavelength λ2 represents a second optical signal transmitted by the wearable device. The wearable device generates two optical signals of different wavelengths and transmits the optical signals to the skin of a human body. In the embodiment of FIG. 3, the first optical signal has the wavelength of a near infrared band and the second optical signal has the wavelength of a visible band.

Skin tissues, blood vessels and the like are present within the human body and consist of different components. Particularly, blood vessels include red corpuscles including hemoglobin and are thus red. Hemoglobin is divided into oxyhemoglobin and deoxyhemoglobin. A large amount of oxyhemoglobin is present in arteries and oxyhemoglobin transmits oxygen to tissues of the human body. A large amount of deoxyhemoglobin is present in veins after transmission of oxygen to the tissues of the human body. That is, arteries and veins have different physical properties due to different kinds of hemoglobin located in arteries and veins. Particularly, oxyhemoglobin/deoxyhemoglobin included in veins have different absorption rates according to change of the wavelength of light. Since veins including oxyhemoglobin/deoxyhemoglobin has a higher absorption rate to a near infrared range wavelength (about 700 to 900 nm) than other surrounding tissues, there is a great difference between amounts of an optical signal of a near infrared range scattered/reflected by veins and other tissues. Such a difference is confirmed as a great brightness difference if an image is generated using the wavelength of the near infrared range. Oxyhemoglobin and deoxyhemoglobin in blood vessels have a high absorption rate to an optical signal of a near infrared band but tissues around blood vessels scatter such an optical signal. Therefore, when an optical signal of a near infrared band reflected by the skin is received, a brightness difference due to a difference in absorption rates between blood vessels and surrounding tissues is confirmed and such a brightness difference may be processed as information of a vein pattern.

The wearable device may sense blood vessels of the human body using a physical property difference of these blood vessels (veins) and other surrounding tissues. That is, the first optical signal A1, B1 and the second optical signal A2 have different wavelengths, a part A1 of the first optical signal A1, B1 is reflected/scattered by the skin of the object 300, and the remainder B1 passes through the skin of the object and is reflected/scattered by the blood vessel 310 in the in the object. The latter B1 reaches the blood vessel 310 and is scattered/reflected by deoxyhemoglobin of the vein. The second optical signal A2 is reflected/scattered by the skin of the object 300 similarly to the part A1 of the first optical signal A1, B1. That is, the first optical signal A1, B1 is an optical signal of a wavelength transmitted by the object 300, passes through layers of the skin and is reflected/scattered/absorbed by the respective layers of the skin. The second optical signal A2 is scarcely transmitted by the object, scattered/reflected by the outer surface of the skin, and has similar features to the part A1 of the first optical signal A1, B1.

The wearable device transmits the first optical signal A1, B1 and the second optical signal A2 to the object and receives optical signals reflected by the object. Such reflected optical signals include a reflected optical signal A1+B1 acquired upon reflection of the first optical signal A1, B1 by the skin and the vein and a reflected optical signal A2 acquired upon reflection of the second optical signal A2. For convenience of description, the reflected optical signal A1+B1 of the first optical signal A1, B1 is referred to as a first reflected optical signal and the reflected optical signal A2 of the second optical signal A2 is referred to as a second reflected optical signal.

The wearable device generates reception data through processing of the first reflected optical signal A+B1, and such reception data includes all information regarding the skin and blood vessels of the object.

Thereafter, the wearable device retransmits the second optical signal A2 having a wavelength differing from the wavelength of the first optical signal A1, B1 to the object. That is, the newly transmitted second optical signal A2 has a wavelength differing from the wavelength of the first optical signal A1, B1 transmitted by the wearable device but similarly includes information regarding the surface of the skin, i.e., the information acquired by the part A1 of the first optical signal A1, B1. That is, the second optical signal A2 is reflected by the skin of the object and received by the wearable device, and the reflected optical signal A2 of the second optical signal A2 similarly includes a part of the information included in the first reflected optical signal A1+B1.

The wearable device generates reception data through processing of the second reflected optical signal A2, and such reception data includes only information regarding the skin differently from the reception data generated through processing of the first reflected optical signal A1+B1.

The wearable device compares the reception data generated based on the first reflected optical signal A1+B1 and the reception data generated based on the second reflected optical signal A2 with each other. Such a comparison process includes subtraction of the data of the second reflected optical signal A2 from the data of the first reflected optical signal A1+B1 by comparing the two reception data with each other. That is, the wearable device may acquire only information regarding blood vessels 310 within the object from the first reflected optical signal A1+B1 by removing influence of the second reflected optical signal A2 from the data of the first reflected optical signal A1+B1. That is, the wearable device may remove information regarding the skin from the first reflected optical signal A1+B1 and acquire only information regarding blood vessels from the part B1 of the first reflected optical signal A1+B1, data acquired through subtraction between the data acquired from the two reflected optical signals may become blood vessel data.

Although this will be described later in detail, the wearable device senses a user's key input motion and generates an input value using information regarding blood vessels included in the blood vessel data. Thereby, the wearable device needs to be operated so as to precisely extract only information regarding blood vessels. The wearable device may effectively acquire only information regarding blood vessels by transmitting optical signals of different wavelengths and calculating a difference therebetween, as described above.

The above description states that the wearable device respectively receives the first reflected optical signal and the second reflected optical signal. Hereinafter, how the wearable device separately senses the two reflected optical signals of different wavelengths will be described. Three methods through which the wearable device receives the first reflected optical signal of the first wavelength and the second reflected optical signal of the second wavelength will be described.

First, the wearable device may separately sense reflected optical signals according to wavelengths. That is, since the wavelengths of the first reflected optical signal and the second reflected optical signal are different, the wearable device may simultaneously receive the two reflected optical signals and then individually process the respective reflected optical signals. That is, although the wearable device simultaneously transmits two optical signals of different wavelengths and simultaneously receives two reflected optical signals, the wearable device may separately process the reflected optical signals according to wavelengths. For example, the wearable device may include photo detectors to separately sense optical signals according to wavelengths.

In the first method, the wearable device may selectively sense the reflected optical signals of different wavelengths. Thereby, although the wearable device transmits optical signals through various manners, i.e., alternately transmits the first optical signal of the first wavelength and the second optical signal of the second wavelength, simultaneously transmits the two optical signals, or periodically or aperiodically transmits one optical signal while continuously transmitting the other optical signal, the wearable device may separately sense reflected optical signals.

Second, the wearable device may separately sense reflected optical signals according to time domains or frequency domains. That is, the wearable device may transmit optical signals of different wavelengths with a time difference or transmit optical signals of different wavelengths at different intensities. Differently from the first method, although the reflected optical signals are not separated from each other according to wavelengths, the wearable device foreknows the transmission times of the optical signals of designated wavelengths and may thus estimate which reflected optical signals correspond to the optical signals.

In the second method, the wearable device may alternately transmit the first optical signal of the first wavelength and the second optical signal of the second wavelength. In this case, the wearable device foreknows which reflected optical signals correspond to the optical signals and thus, a burden to separate the reflected optical signals according to wavelengths may be reduced. In this method, the wearable device may alternately transmit the two optical signals or periodically or aperiodically transmit one optical signal while continuously transmitting the other optical signal.

Third, there is a case that optical signals are transmitted at different intensities. The wearable device may transmit different optical signals at different output intensities. This method may be combined with the above-described first method and second method. In this method, the wearable device senses a relatively large intensity difference between the reflected optical signals and thus more effectively detects the reflected optical signals according to time domains or frequency domains.

The above description states the embodiment in which the wearable device transmits the first optical signal and the second optical signal and analyzes the reflected optical signals. However, the optical signals generated and received by the wearable device may be influenced by indoor light and natural light in surrounding environments where the wearable device is operated. For example, if the wearable device generates a second optical signal of a visible light wavelength and transmits the second optical signal to an object, a reflected optical signal of the second optical signal may be mixed with an optical signal generated upon reflection of sunlight by the object and thus, noise may be generated. Therefore, a process for removing such noise may be required.

There are various methods for removing the influence of external light. First, the wearable device may be operated so as to exclude external factors, such as natural light, indoor light, light due to a beam projector and the like. That is, the wearable device may recognize light, sensed by the optical signal sensing unit prior to transmission of optical signals from the optical signal transmission unit, as external light. Thereafter, the wearable device may remove influence of the external light from reflected optical signals sensed after transmission of the optical signals, thus acquiring only reflected optical signals of the optical signals transmitted from the wearable device.

Second, the wearable device may use external light instead of removal of the influence of external light. That is, if the wearable device uses an optical signal of a near infrared wavelength as the first optical signal and an optical signal of a visible wavelength as the second optical signal, the wearable device may selectively receive external light instead of direct generation and transmission of the first optical signal and the second optical signal. In more detail, the first optical signal and the second optical signal which the wearable device desires to generate may be generated by external light. In this case, the wearable device may filter a reflected optical signal generated upon reflection of the external light by the object and thus selectively receive reflected optical signals of designated wavelengths. Thereby, although the wearable device does not directly generate optical signals, the wearable device may acquire the same or similar effect as or to direct generation of the optical signals using external light. However, if external light is used, optical signals of desired wavelengths may not be sufficiently received and thus, the wearable device may analyze the external light and additionally generate and transmit only an optical signal of a necessary wavelength to supplement the external light.

Accordingly, in order to receive reflected optical signals of specific wavelengths, the wearable device may directly generate optical signals and transmit the optical signals to an object so as to acquire a desired result, or selectively receive external light so as to acquire the same result.

In the above description, the terms first optical signal, second optical signal, first reflected optical signal, second reflected optical signal and the like are used. However, it will be understood that the terms "first", "second", etc. may be used only to discriminate one element from other elements, and the scope of the present invention is not limited by these terms.

The above-described first optical signal and second signal may be a signal of a near infrared range and a signal of a visible range. However, the disclosure is not limited thereto and the first optical signal and the second optical signal may be optical signals of a near infrared range or optical signals of an infrared range. That is, only if the wavelength bands of the two optical signals are different, the wearable device may transmit the two optical signals, receive reflected optical signals and thus acquire information regarding blood vessels. Since skins, blood vessels and surrounding tissues have different absorption/scattering/reflection rates according to wavelengths of optical signals, different first reflected optical signal and second reflected optical signal of a near infrared range of an infrared range include different pieces of biometric information. That is, the wearable device transmits two or more optical signals and thus acquires information regarding blood vessels but wavelength bands or kinds of the optical signals are not limited. Therefore, although hereinabove and hereinafter a near infrared range and a visible range are exemplarily described, it may be understood that optical signals having different wavelength bands are used.

in accordance with another embodiment, the wearable device may acquire information regarding blood vessels using only one optical signal not two optical signals. That is, as described above, blood vessels and surrounding tissues have different absorption rates and scattering rates to an optical signal of a near infrared band (700 nm-900 nm). The reason for this is that skin tissue layers have different reflection rates according to variation of the spectrum and wavelength of an optical signal. The wearable device may confirm a brightness difference between blood vessels and surrounding tissues through comparison/combination/analysis of such information and detect a pattern of the blood vessels. Of course, a method in which the wearable device transmit and receives three or more optical signals may be employed. During a process of using two or more optical signals, the optical signals may have different wavelengths, different spectrums, different transmission times (points of time), different reception times (points of time), different frequencies or different polarization states.

Overall, the wearable device may transmit a plurality of optical signals having different wavelengths in a visible range and an infrared range, receive reflected optical signals and execute comparison/analysis/combination of the optical signals according to wavelengths, thus acquiring image data of blood vessels and surrounding tissues.

Otherwise, the wearable device may acquire image data of blood vessels and surrounding tissues by transmitting and receiving only one optical signal in a single near infrared range, thus recognizing a pattern of the blood vessels. Consequently, the wearable device may acquire information regarding blood vessels by transmitting and receiving one or more optical signals.

In accordance with an embodiment in which two methods are combined, the wearable device may transmit and receive two or more optical signals during a process of initially acquiring blood vessel data and then transmit and receive one optical signal during a process of sensing a user's key input motion. On the other hand, the wearable device may transmit and receive only one optical signal during a process of initially acquiring blood vessel data and then transmit and receive two or more optical signals during a process of sensing user's movement.

FIGS. 4 to 7 illustrate a procedure of the wearable device to acquire information regarding blood vessels and generate an input value according to the above-described process. FIG. 4 is a view illustrating an operating process of the wearable device in accordance with one embodiment of the present invention. FIG. 4 illustrates an embodiment in which the wearable device 100 is worn on a first phalange of the thumb of a user's left hand.

As described above, the wearable device 100 includes the optical signal transmission unit 105 and the optical sensing unit 110. FIG. 4 illustrates a type of the wearable device 100 in which the optical signal transmission unit 105 and the optical sensing unit 110 are disposed adjacent to each other and other functional modules which are not represented by reference numerals are arranged in a line. Such an arrangement type is only an exemplary implementation for convenience of description and the elements included in the wearable device 100 are not limited to the arrangement type.

That is, the wearable device 100 may include one or more optical signal transmission units 105 and one or more optical sensing units 110 and they may be separated from each other by a designated distance or more. Further, if two wearable devices 100 separated from each other are provided, each of the two wearable devices 100 may include one optical signal transmission unit 105 and one optical sensing unit 110. Further, although the wearable device 100 shown in FIG. 4 is implemented as a ring type, the wearable device 100 is not limited thereto, as described above with reference to FIG. 1.

The wearable device 100 is worn on a user's body, senses a user's hand which is an object 410, and acquires information regarding blood vessels 400 within the object 410. That is, the wearable device 100 is worn on a part of the user's body or an article, transmits optical signals to the object 410, and receives optical signals reflected by the outside or inside of the object 410, thus acquiring information regarding blood vessels 400.

FIG. 5 is a view illustrating an operating process of the wearable device in accordance with one embodiment of the present invention. FIG. 5 illustrates a process of generating a 3D model of a user's hand through the wearable device.

First, the left portion of FIG. 5 will be described. The depth sensor of the wearable device 3-dimensionally senses a user's hand and generates 3D scan information. As shown in this figure, in order to generally scan a user's left hand, the wearable device may be worn on other body parts (for example, the thumb of the right hand) instead of the thumb of the left hand. The user may move his/her right hand on which the wearable device is worn around his/her left hand so that the depth sensor may 3-dimensionally scan the left hand.

In the wearable device, information regarding the palm of a user's hand is more important than information regarding the back of the user's hand. Therefore, the user may move the wearable device such that the depth sensor executes scanning at a low speed when the depth sensor faces the palm of the left hand and execute scanning at a higher speed when the depth sensor faces the back of the left hand so as to allow the wearable device to precisely acquire 3D scan information of the palm of the user's hand. Otherwise, if it is not necessary to precisely acquire 3D information of the back of the hand, the user may omit the 3D scanning process of the back of the hand.

The depth sensor generates 3D scan information of the user's hand and transmits the corresponding information to the image processor. The image processor generates a 3D model 500 of the user's left hand by analyzing and processing the 3D scan information. The 3D model 500 may be a 3D image and be generated through a 3D rendering process.

The 3D model 500 generated using a result of scanning by the depth sensor, i.e., the 3D scan information, may not sufficiently include information regarding blood vessels required by the wearable device. That is, blood vessels on the palm of the hand are visible dimly and are not clear enough to be sensed by the wearable device so as to generate an input value. That is, the depth sensor may precisely measure the external appearance of the user's hand but may not sense detailed features, such as the distribution and arrangement of blood vessels.

Thus, a process of adding a pattern to the 3D model 500 is performed, as shown in the right portion of FIG. 5. The wearable device acquires information of blood vessels of the palm of the hand using the optical signal transmission unit and the optical signal sensing unit, as described above with reference to FIGS. 2 and 3, and a pattern 520 of the blood vessels is generated using the acquired information.

A series of processes of sensing blood vessels and generating pattern information through the wearable device may be carried out simultaneously with or separately from the process of generating 3D scan information through the depth sensor. That is, while the depth sensor 3-dimensionally recognizes a user's hand and generates 3D scan information, the optical signal sensing unit may sense the blood vessels and the data processor may generate pattern information. In this case, both the 3D scan information and the pattern information regarding blood vessels are transmitted to the image processor and the image processor sequentially processes the two pieces of information and generates a 3D model. In such an embodiment, a pattern added 3D model 510 having the pattern 520 may be generated through one scan process.

Differently, when the depth sensor scans a hand and generates 3D scan information and the image processor generates a 3D model using the 3D scan information, a process of generating pattern information through the optical signal sensing unit and the data processor may be additionally performed. In this case, the process of scanning an object, i.e., a hand, through the wearable device needs to be carried out twice. That is, in the former case, both 3D scan information and pattern information are generated by one scan process but, in the latter case, 3D scan information may be generated through the first scanning process and pattern information may be generated through the second scanning process. In the latter case, the image processor generates a 3D model in advance and then processes received pattern information.

The pattern information generated by the data processor is transmitted to the image processor and a process of mapping the pattern 520 onto the 3D model 500 is performed. That is, the image processor may generate the pattern-added 3D model 510 by executing the process of mapping the pattern 520 onto the 3D model 500 generated by the 3D scan information. The pattern 520 includes information regarding blood vessels, and blood vessels (for example, veins) have different depths and thicknesses according to parts of human body and may thus be considered as 3D stereoscopic structures. Therefore, the pattern 520 of the blood vessels Mapped onto the 3D model 500 may have 3D information (depth, thickness, direction and the like) on the surface of the skin and under the surface of the skin.

FIGS. 6 and 7 illustrate a process of analyzing a user's motion using the above-described 3D model and pattern of blood vessel through the wearable device. FIG. 6 is a view illustrating an operating process of the wearable device in accordance with one embodiment of the present invention.

As exemplarily described with reference to FIG. 5, the image processor generates 3D model of an object (for example, a user's left hand) using 3D scan information and pattern information. After such an initial process of generating the 3D model has been performed, the wearable device 100 continuously senses user's blood vessels. That is, the optical signal sensing unit continuously receives optical signals reflected by the object and the data processor senses change of the external appearances of the blood vessels by continuously analyzing the reflected optical signals of different wavelengths. For example, the wearable device 100 senses change of the external appearances of blood vessels located on the palm of the hand or phalanges of the finger or senses change of the external appearances of blood vessels located at a joint connecting the palm of the hand or a phalange of the finger.

When a user performs a key input motion (i.e., typing), the positions and arrangement of blood vessels of the hand in a space are changed according to movement of fingers. For example, as a finger is bent, an angle formed by blood vessels located at the first phalange and the second phalange of the finger decreases and the blood vessels approach each other. Thereby, the distribution and arrangement of the blood vessels sensed by the optical signal sensing unit of the wearable device 100 are changed.

The wearable device 100 may compare the sensed physical features with Line generated pattern of the 3D model, That is, the wearable device 100 generates the 3D model in advance using pattern information regarding user's blood vessels. Therefore, when the positions of the blood vessels are changed due to a user's key input motion, sensed information of the blood vessels may be compared with the blood vessel pattern of the generated 3D model.

For example, the wearable device 100 senses a user's key input motion under the condition that the blood vessel pattern of the user's hand generated in FIGS. 4 and 5 is added to the 3D model and the pattern-added 3D model is stored. When the user moves a left hand 600 and presses a specific key, the wearable device 100 senses change of blood vessels of the left hand 600. The optical signal sensing unit of the wearable device 100 may sense the positions and arrangement of the blood vessels by continuously sensing optical signals reflected by the blood vessels of the left hand 600 and compare the sensed information of the blood vessels with the pre-stored pattern of the 3D model.

The wearable device 100 may detect how to operate the motion of the left hand 600 according to change of the blood vessels and calculate change of an angle formed by the first phalange and the second phalange of a finger as the finger is bent. Such a calculation process may be performed through comparison between change of the blood vessels and the pre-stored pattern of the 3D model and, consequently, the position of the tip of the finger in a 3D space according to the key input motion is calculated. The 3D position of the tip of the finger according to the key input motion determines a designated key matching the key input motion and the wearable device 100 generates an input value using the corresponding key. A detailed description thereof will be given later with reference to FIG. 7.

In summary, the wearable device 100 continuously senses user's blood vessels and compares the sensed change of the arrangement, distribution and positions of the blood vessels with the stored 3D model. From such a result of comparison, the wearable device 100 may calculate a designated input value matching the key input motion.

FIG. 7 is a view illustrating an operating process of the wearable device in accordance with one embodiment of the present invention. In FIG. 7, x/y/z axes represent a 3D space and lines connecting the origin and points P1, P2, P3 and P4 represent a frame from a user's wrist to a finger if an object is a user's hand. That is, the origin represents the center of the wrist, the point P1 represents a joint connecting the palm to the first phalange of the finger, the point P2 represents a joint connecting the first phalange to the second phalange of the finger, the point P3 represents a joint connecting the second phalange to the third phalange of the finger, and point P4 represents the tip of the finger.

As described above with reference to FIG. 6, the wearable device may calculate the 3D position and bending angle of a joint connecting the first phalange to the second phalange of a user's finger, That is, the wearable device may calculate a 3D position of the point P2 and an angle $\theta2$ in FIG. 6. Since the wearable device generates and stores a 3D model of a user's hand, calculation of the 3D position of the point P2 means calculation of a distance d1 from the center of the wrist to the point P2.

Similarly to the point P2, the wearable device may calculate a 3D position of the point P1 and an angle $\theta1$. Otherwise, during the process of generating the 3D mode, the wearable device may calculate a distance from the center of the wrist to a joint between the palm and the first phalange, i.e., the position of the point P1, in advance. In this case, the wearable device may calculate the angle $\theta1$ through comparison with the pattern in a similar manner as the angle $\theta2$. That is, the wearable device may calculate the positions and bending angles of the respective joints by comparing change of the positions, sizes and external appearances of the blood vessels of the respective joints with the pre-stored pattern.

On the assumption that a user's finger is bent according to a natural motion, if the coordinates of the point P1, the coordinates of the point P2, and the angles $\theta1$ and $\theta2$ are given, all of the coordinates of the point P3, the angle $\theta3$ and the coordinates of the point P4 may be calculated. Such a process may be carried out by an experimental method, i.e., estimation by experience. However, unless the user consciously bends finger joints by abnormal angles, the coordinates of the point P3 and the angle $\theta3$ may be calculated with high precision from relations among the coordinates of the point P1, the coordinates of the point P2, and the angles $\theta1$ and $\theta2$. Further, similarly, the position information of the point P4 may be precisely calculated from relations among the coordinates of the point P1, the coordinates of the point P2, the coordinates of the point P3, and the angles θ1, θ2 and θ3.

In the above-described process, the ranges of the angles θ1, θ2 and θ3 may become an issue. That is, the angles θ1, θ2 and θ3 need to be within 180 degrees. If a user raises a finger highly, a joint connecting the user's palm and the first phalange of the finger may be 180 degrees or more. However, such an angle is far from a normal key input motion. Therefore, during a process of measuring the angles θ1, θ2 and θ3 of the joints, the wearable device may acquire only values of angles which are within 180 degrees as significant values. The wearable device may be implemented so as to ignore values of the angles θ1, θ2 and θ3 which are greater than 180 degrees, or to map the angles θ1, θ2 and θ3 which are greater than 180 degrees to a specific motion.

There are various methods to improve precision in such an estimation process. For example, after generation of the 3D model of a hand is initially carried out, the wearable device may instruct a user to perform a motion to input a specific key. When the user makes a natural motion to input the corresponding key, the wearable device may sense such a motion and foreknow which value needs to be compensated for during the estimation process of the point P3, the point P4 and the angle θ3. That is, software compensation may be carried out during a process of calculating an input value according to a user's key input motion.

In another method, the wearable device may directly measure the 3D position of the point P3 and the angle θ3. That is, the optical signal sensing unit and the data processor may compare blood vessels around the joint connecting the second phalange to the third phalange of a finger with the pattern of the 3D model and thus measure the 3D position and bending angle of the corresponding joint. In this case, since the wearable device directly measures the points P1, P2 and P3, the angles θ1, θ2 and θ3 and a distance d2, precision in estimation of the point P4 is greatly raised. Otherwise, the above-described software compensation method may be carried out together with the method of directly measuring the point P3 and the angle θ3.

Consequently, as a user performs typing, the wearable device senses a key input motion judges a key to which the corresponding key input motion corresponds, and generates an input value. Such an input value may be transmitted to an external device or a server connected to the wearable device and the wearable device is operated as an input unit.

The embodiment in which the wearable device senses key input motions of the forefinger, the middle finger, the ring finger and the little ringer of a user's hand has been described above. Further, the wearable device needs to sense a key input motion of the thumb. First, a case that the wearable device is worn on the thumb will be described. The wearable device may directly measure or indirectly estimate the position of the thumb on which the wearable device is worn.

If the wearable device is worn on a user's thumb and directly measures a key input motion of the thumb, the optical signal sensing unit and the data processor sense an angle sufficient to recognize the position of the tip of the thumb. Thereby, the wearable device may calculate 3D position information of the thumb on which the wearable device is worn. Further, the wearable device may also calculate by what distance the wearable device is separated from the position of the tip of the thumb.

Differently, if the wearable device indirectly measures the key input motion of the thumb, the wearable device may estimate the position of the thumb from the positions of joints of other four fingers. That is, the wearable device may estimate its own 3D position from the positions of the points P1 and P2 of the other four fingers. If the wearable device estimates its own position using the points P1 or P2, the points P1 or P2 of the four fingers, i.e., information of four positions, may be used and, if the wearable device estimates its own position using the points P1 and P2, information of eight positions may be used to estimate the position of the wearable device. That is, the wearable device has a sufficient number of pieces of information to specify its own position in a 3D space and may thus estimate the position of the thumb on which the wearable device is located from the position information of the joints of the other four fingers. The two methods in which the thumb measures/estimates the position thereof may be similarly applied to a case that the wearable device is worn on the forefinger, the middle finger, the ring finger or the little finger. That is, the wearable device may also measure the position of the tip of a finger on which the wearable device is worn.

If the wearable device is worn on one of the other four fingers instead of the thumb and senses the position of the thumb, the thumb has a different structure from the four fingers and thus, a different process of measuring the position and angle of the thumb is required.

Differently from the other four fingers, the thumb includes a joint connecting the palm and the first phalange and a joint connecting the first phalange and the second phalange, i.e., two joints. That is, even if the wearable device acquires the positions of the two joints, the wearable device may measure the position of the tip of the thumb. Therefore, if the wearable device is worn on any other finger instead of the thumb, the point P3 measured from the points P1 and P2 and the angles θ1 and θ2 becomes the position of the tip of the thumb. Thereby, the wearable device may measure the position of the tip of the thumb with higher precision than the other four fingers.

The embodiment in which the wearable device senses blood vessels at joints of a finger, compares the sensed information with the pre-stored pattern, senses a key input motion, and calculates the 3D position of the tip of the finger has been described. As described above, the 3D position of the tip of the finger may match a specific input value, and the wearable device may confirm a key to which the key input motion corresponds, from the 3D position of the finger, and generate an input value using the confirmed key.

Hereinafter, differently from the above description, an embodiment in which the wearable device senses blood vessels around phalanges of a finger will be described. That is, the wearable device may detect the 3D position of the tip of the finger by sensing blood vessels at the phalanges of the finger as well as the joints of the finger. For example, the wearable device may sense the position P1 and angle θ1 of the joint connecting the palm and the first phalange of the finger by sensing the arrangement and distribution of blood vessels of the palm and the first phalange of the finger, and sense the position P2 and angle θ2 of the joint connecting the first phalange and the second phalange of the finger by sensing blood vessels of the first phalange and the second phalange of the finger. The above-described embodiment may be similarly applied to a process of estimating the position of the tip of the finger by measuring the positions of the two joints.

Further, even if the wearable device senses only one phalange of a finger, the wearable device may sense the position of a joint. That is, the pattern information of blood vessels added to the 3D model may be 3D information and thus include information regarding thicknesses and tilts of the blood vessels, as described above, Therefore, the wearable device may detect positions of other joints by sensing blood vessels from a single phalange of a finger and comparing the sensed blood vessel information with the pre-stored pattern. In connection with such an embodiment, as a finger is bent, not only the arrangement and positions of blood vessels but also brightness and chroma of the blood vessels are changed. That is, as a finger is bent, the confirmed external appearances of blood vessels are changed, i.e., flesh of the finger is folded or wrinkles are made. Accordingly, the wearable device may detect the position of the tip of the finger in overall consideration of sensed transparency, brightness, chrome and the like of the blood vessels.

FIG. 8 is a view illustrating an operating process of the wearable device in accordance with one embodiment of the present invention. FIG. 8 illustrates an embodiment in which the wearable device senses user's mouse input motion and mouse click motion and generates a cursor value and a click value.

If the wearable device 100 moves in a space, the gyroscope sensor 150 and the acceleration sensor 160 measures change of the position, change of the acceleration and change of the tilt of the wearable device 100 in the space. Therefore, the wearable device 100 may sense a user's mouse input motion in which a user wearing the wearable device 100 moves his/her hand in the space. Further, the wearable device 100 may sense a user's mouse click motion in which the user's forefinger or middle finger contacts the user's thumb during the mouse input motion.

First, an embodiment in which the wearable device 100 senses a mouse input motion and generates of a cursor value will be described. When change of the position of the wearable device 100 in the space is measured, the gyroscope sensor 150 and the acceleration sensor 160 senses a user's mouse input motion. The user's mouse input motion is a user's motion to move a mouse cursor from a specific position to another position and matches a designated cursor value. The cursor value may be transmitted to an external device or the server and designate the movement direction and movement value of the mouse cursor.

The reference position of the cursor value may be the central part 860 of a user's palm. That is, the cursor value according to the mouse input motion may be determined based on the central part 860 of the palm. This is caused by the fact that, even if the user moves his/her hand and fingers, the central part 860 of the palm is less influenced by such movement. That is, when the forefinger and the middle finger are bent due to a mouse click motion, which will be described later, other parts of the hand are difficult to serve as a precise reference position due to movement of muscles connected to the fingers. On the other hand, the position of the central part 860 of the palm is relatively regular even if the mouse click motion is sensed during the mouse input motion. Therefore, the wearable device 100 generates a cursor value based on change of the position of the central part 860 of the palm. Otherwise, the wearable device 100 may use the position of a central part of the back of the hand or the position of a central part of the thumb as a reference position of the cursor value, instead of the central part 860 of the palm.

Thereafter, a mouse click motion will be described. While the mouse input motion is sensed, the finger recognition unit 120 of the wearable device 100 may continuously sense the positions of the tips 810, 820, 830 and 840 of the fingers. Such a process may be performed in accordance with the above-described embodiment with reference to FIGS. 5 to 7.

While the mouse input motion is sensed according to movement of the wearable device 100 in the space, the wearable device 100 senses whether or not the forefinger and the middle finger come into contact with the thumb. Such a process is performed based on whether or not the position of the tip 810 of the forefinger and the position of the tip 820 of the middle finger are adjacent to the wearable device 100 by a designated distance or less. That is, if the wearable device 100 is worn on the thumb, contact of the forefinger and the middle finger with the thumb means that the positions 810 and 820 of the tips of the two fingers are adjacent to the wearable device 100 by a designated distance or less. Therefore, the wearable device 100 may sense the mouse click motion based on the positions of the tips 810 and 820 of the two fingers.

Otherwise, the wearable device 100 may sense the mouse click motion by comparing the positions 810 and 820 of the tips of the two fingers and the position 850 of the tip of the thumb. That is, as shown in FIG. 7, the wearable device 100 may detect the position of the thumb, Therefore, the wearable device 100 may sense the mouse click motion through a process of comparing the positions 810, 820 and 850 of the tips of the three fingers.

Thereafter, the wearable device 100 generates a click value matching the mouse click motion. The click value may include a left click value matching a mouse click motion in which the forefinger contacts the thumb and a right click value matching a mouse click motion in which the middle finger contacts the thumb. Further, the wearable device 100 may treat the case that the forefinger and the middle finger contact the thumb as a separate click value.

The wearable device 100 may transmit the generated click value to an external device or the server. Since the mouse click motion is sensed while the mouse input motion is sensed, the click value together with the cursor value according to the mouse input motion is transmitted. Thereby, the wearable device 100 may click an external device or the server while moving the mouse cursor. That is, the wearable device 100 may serve as a "spatial mouse" which is an input unit to control the mouse through movement in a space.

FIG. 9 is a view illustrating art operating process of the wearable device in accordance with one embodiment of the present invention. FIG. 9 illustrates an embodiment in which the wearable device 100 outputs an image to the outside in detail.

As exemplarily shown in FIG. 1, the wearable device 100 includes the image output unit 140 and the image output unit 140 may output an image of a fixed size to a fixed position of the outside. For example, as exemplarily shown in FIG. 9, the wearable device 100 worn on the object 900, i.e., a user's finger, may output an image 910 to the outside, and the image 910 may be output to various places, such as a part of a human body and an article.

When the wearable device 100 outputs the image 910, the wearable device 100 may analyze blood vessel information and then output the image 910 of a fixed size to a fixed position. That is, the wearable device 100 may compare information of blood vessels sensed according to movement of a user with the blood vessel pattern of the pre-stored 3D model and measure a distance and an angle between the object 900 to which the image 910 is output and the wearable device 100. That is, the wearable device 100 may calculate the size and angle of the image 910 output to the object 900 by calculating positional relations of the wearable device 100 with the external object 900 to which the image 910 is output.

Thereafter, the wearable device 100 continuously senses user's movement and outputs the image 910 of a fixed size to a fixed position. That is, when the arrangement and distribution of sensed blood vessels of the object 900 are changed according to user's movement, the wearable device 100 continuously corrects the angle and size of the image 910 projected onto the object 900. Thereby, although relative positional relations of the wearable device 100 with the object 900 are changed according to user's movement, the wearable device 100 may output the image 910 of the fixed size to the fixed position.

In the above-described embodiment, the process of fixedly outputting the image 910 from the wearable device 100 using the pre-stored 3D model is described. However, the wearable device 100 may fixedly output the image 910 without a process of generating the 3D model.

That is, the wearable device 100 may 2-dimensionally analyze only the sensed pattern of blood vessels without use of the pre-stored 3D model. Although the wearable device 100 analyzes only the pattern of blood vessels, the wearable device 100 may fixedly output the image 910 by comparing the pattern of blood vessels with the pre-stored pattern information of blood vessels. Further, the wearable device 100 may detect its own position in a space using the gyroscope sensor and the acceleration sensor and fixedly output an image based on the detected position.

The above-described reflected optical signal sensing methods may be used in the process of fixedly outputting an image through the wearable device 100. That is, the wearable device 100 may measure the distance and angle thereof from the external object by transmitting a patterned optical signal and receiving a reflected optical signal while the wearable device 100 outputs an image. In such a process, the optical signal transmitted during output of the image may have the same wavelength as the wavelength of the image (for example, the wavelength of visible light) or different wavelength from the wavelength of the image, if the wavelength differing from that of the image is used, the wearable device 100 may easily sense the reflected optical signal and, if the same wavelength as that of the image is used, the wearable device 100 may selectively receive the reflected optical signal using information regarding the output times of optical signals foreknown by the wearable device 100.

As another example, the wearable device 100 foreknows information regarding the image 910, which the wearable device 100 outputs, and may thus use the information. That is, the wearable device 100 may calculate the size and angle of the image 910 projected at a designated distance, sense the image 910 actually projected onto the object 900 as the reflected optical signal of visible light, and calculate a difference therebetween. The wearable device 100 may detect relative position and angle relations between the object 900 and the wearable device 100 by compensating for such a difference.

As another example, the wearable device 100 may fixedly output the image using the above-described depth sensor instead of sensing of reflected optical signal. That is, the wearable device 100 may use a patterned optical signal during a process of sensing the object using the depth sensor through two methods. In more detail, the wearable device. 100 foreknows the transmission time and frequency band of the patterned optical signal and may thus foreknow the reception time of the optical signal. In this case, the depth sensor of the wearable device 100 may calculate the distance and angle of the wearable device 100 from the object from pre-stored information regarding the time and information regarding the frequency band. On the other hand, although the wearable device 100 does not know information regarding the optical signal, the wearable device 100 may receive the optical signal using a unit to selectively sense wavelength bands of the patterned optical signal.

As yet another example, the wearable device 100 may output a predetermined pattern 920 added to the edge of the image 910, as exemplarily shown in this figure. Such a pattern 920 differs from the above-described pattern of blood vessels and means a marker added to the circumference of the image 910 or a distinguishable indicator. The wearable device 100 may transmit the image 910, to which such a pattern 920 is added, and thus analyze the shape, size, and tilt degree of the pattern 920 projected onto the object 900, thereby detecting the distance, angle and positional relations between the object 900 and the wearable device 100.

FIGS. 10(a) and 10(b) are views illustrating implementation types of a wearable device in accordance with other embodiments of the present invention. Although the above description states the ring type wearable device 100, the implementation type of the wearable device 100 is not limited thereto. That is, the wearable device 100 may be implemented as various types, such as a glove type worn on the palm of a user's hand, a bracelet type surrounding a user's wrist or arm, as exemplarily shown in FIG. 10(a), a clip type worn on an article, such as clothes or a necktie, as exemplarily shown in FIG. 10(b), and or a necklace type. The wearable device 100 is not limited as to the implementation type thereof and may sense user's key input motion, mouse input motion, mouse click motion and the like. That is, although the wearable device 100 is implemented as a necklace type which is not shown in the drawings, the wearable device 100 may perform the same motion as if the wearable device 100 is implemented as other types.

In the embodiment shown in FIG. 10(a), the wearable device 100 is implemented as a bracelet type surrounding a user's wrist and senses user's key input motion, mouse input motion, mouse click motion and the like. In this embodiment, the wearable device 100 may output images 1010, 1020 to the palm or hack of a user's hand and a user's arm.

In the embodiment shown in FIG. 10(b), the wearable device 100 is implemented as a clip type worn on a sleeve of clothes. The wearable device 100 may output an image 1030 to the palm or back of a user's hand and output an image to an article (for example, clothes) not a part of a human body. Although not shown in this figure, the wearable device 100 may be worn on a necktie or a collar.

As described above, the wearable device 100 may be operated in the same or similar manner as or to the above-described embodiments regardless of the implementation type of the wearable device 100.

The above description states the embodiment in which the wearable device 100 senses a part of a human body on which the wearable device 100 is worn (for example, a hand on which the wearable device 100 is worn). However, the wearable device 100 may also sense another part of the human body on which the wearable device 100 is not worn (for example, another hand on which the wearable device 100 is not worn).

For convenience of description, a case that the ring-type wearable device 100 is worn on a user's left hand will be described. In this case, the wearable device 100 may also sense the user's right hand on which the wearable device 100 is not worn. That is, the wearable device 100 may sense the key input motion and spatial mouse movement of the user's right hand and project an image onto the user's right hand.

However, in order to sense the user's right hand on which the wearable device 100 is not worn, the wearable device 100 needs to know the distance and positional relations with the user's right hand. That is, if the user moves the left hand, the wearable device 100 does not correctly know whether or not the user's left hand on which the wearable device 100 is worn moves or the user's right hand on which the wearable device 100 is not worn moves.

Various methods are used to solve such a problem. As one example, the wearable device 100 may generate a 3D relative coordinate system using the wearable device 100 as the origin and recognize the user's right hand as one object. In this case, fingers of the user's left hand are also recognized as objects and the positions thereof are indicated on the coordinate system of the wearable device 100.

As another example, the wearable device 100 may use the acceleration sensor or the gyroscope sensor. If the user's right hand on which the wearable device 100 is not worn moves, values measured by the two sensors are not changed. Therefore, the wearable device 100 may detect movement of the user's left hand on which the wearable device 100 is worn and movement of the user's right hand on which the wearable device 100 is not worn through change of the values measured by the two sensor.

As yet another example, an external sensor may sense movement of the wearable device 100. That is, if the external device measures the position of the wearable device 100 in a 3D space and transmits the measured position to the wearable device 100, the wearable device 100 may easily detect whether or not the user's left hand on which the wearable device 100 is worn moves.

In any example, the wearable device 100 may easily detect the relative distance and positional relations between the user's left and right hands and thus continuously sense the user's right hand similarly to the user's left hand.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:
1. A device comprising:
an optical signal transmitter configured to transmit optical signals including a first optical signal having a first wavelength and a second optical signal having a second wavelength;
an optical signal sensor configured to receive reflected optical signals generated upon reflection of the optical signals by blood vessels of an object, wherein the reflected optical signals include:
a first reflected optical signal caused by the first optical signal, and
a second reflected optical signal caused by the second optical signal;
one or more processors configured to:
process the received reflected optical signals and generate pattern information regarding the blood vessels of the object based on the first reflected optical signal and the second reflected optical signal;
determine a user's key input motion based on data acquired by processing the reflected optical signals, and
generate an input value matching the key input motion; and
a depth sensor configured to generate 3D scan information based on 3-dimensionally sensing the object, wherein the one or more processors are configured to generate a 3D model of the object based on the 3D scan information and to add a pattern representing the blood vessels to the 3D model based on the pattern information.

2. The device according to claim 1, wherein the one or more processors are configured to acquires blood vessel data by subtracting second data from first data, wherein the second data is acquired by processing the second reflected optical signal and the first data is acquired by processing the first reflected optical signal.

3. The device according to claim 2, wherein the one or more processors are configured to generates the pattern information regarding blood vessels using the blood vessel data.

4. The device according to claim 1, wherein
the one or more processors are configured to determine the user's key input motion by comparing the information regarding blood vessels changed according to the user's key input motion with the pattern added to the 3D model.

5. The device according to claim 4, wherein the pattern information regarding the blood vessels are acquired by sensing distribution of at least one of color, chroma and brightness due to the blood vessels of the object through the optical signal sensing unit.

6. A device comprising:
an optical signal transmitter configured to transmit optical signals including a first optical signal having a first wavelength and a second optical signal having a second wavelength;
an optical signal sensor configured to receive reflected optical signals generated upon reflection of the optical signals by blood vessels of an object, wherein the reflected optical signals include:
a first reflected optical signal caused by the first optical signal, and
a second reflected optical signal caused by the second optical signal;
one or more processors configured to:
process the received reflected optical signals and generate pattern information regarding the blood vessels of the object based on the first reflected optical signal and the second reflected optical signal;
determine a user's key input motion based on data acquired by processing the reflected optical signals,
determine 3D positions of a first joint and a second joint of the object, wherein the first joint represents a connection between a palm and a first phalange of a finger and the second joint represents a connection between the first phalange and a second phalange of the finger, and
generate an input value based on the 3D positions of the first joint and the second joint, wherein the input value matches the key input motion.

7. The device according to claim 6, wherein the one or more processors are further configured to:
determine bending angles of the first joint and the second joint,
calculate a 3D position of a tip, wherein the tip represents a distal end of the finger, and
determine the key input motion according to the 3D positions of the tip, the first joint, and the second joint, along with the angles of the first and second joints.

8. The device according to claim 1, wherein the optical signal sensor respectively senses the first reflected optical signal and the second reflected optical signal by separating a received reflected optical signal according to wavelengths.

9. The device according to claim 1, wherein the optical signal sensor respectively senses the first reflected optical signal and the second reflected optical signal separately received according to time domain or frequency domain multiplexing.

10. A wearable device comprising:
an optical signal transmitter configured to transmit optical signals;
an optical signal sensor configured to receive reflected optical signals generated upon reflection of the optical signals by blood vessels of an object;
one or more processors unit configured to:
process the received reflected optical signals; and
calculate the distance and angle of the wearable device with the object based on data acquired by processing the reflected optical signals; and
an image display configured to output an image to the outside, wherein:
the optical signal transmitter transmits a first optical signal and a second optical signal having different first and second wavelengths;
the optical signal sensor receives a first reflected optical signal caused by the first optical signal and a second reflected optical signal caused by the second optical signal;
the one or more, processors are configured to:
generates pattern information regarding the blood vessels of the object based on the first reflected optical signal and the second reflected optical signal; and
calculate the distance and angle of the wearable device with the object by comparing the pattern information with pre-stored blood vessel information; and
the image display outputs the image of a fixed size to a fixed position based on the distance and angle.

11. The wearable device according to claim 10, wherein the one or more processors are configured to acquires blood vessel data generated by subtracting data, acquired by processing the second reflected optical signal, data, acquired by processing the first reflected optical signal.

12. The wearable device according to claim 11, wherein the one or more processors are configured to generates the pattern information regarding blood vessels of the object using the blood vessel data.

13. The wearable device according to claim 10, wherein the optical signal sensor respectively senses the first reflected optical signal and the second reflected optical signal by separating a received reflected optical signal according to wavelengths.

14. The wearable device according to claim 10, wherein the optical signal sensor respectively senses the first reflected optical signal and the second reflected optical signal separately received according to time domains or frequency domains.

15. The device according to claim 1, wherein the one or more processors are configured to:
determine a position of the object relative to a reference point; and
generate the pattern information including one or more positions of the blood vessels relative to the reference point.

16. The device according to claim 1, wherein the one or more processors are configured to:
generate 3D positions of one or more points on the object based on 3-dimensionally sensing the object;
generate a 3D model of the object based on the on the 3D positions; and
add the pattern information representing the arrangement of the blood vessels to the 3D model of the object.

17. The device according to claim 1, wherein:
the object is a hand of a user interfacing with the device; and
the one or more processors are configured to determine a 3D shape of the hand based on the pattern information.

18. The device according to claim 1, wherein the device is a wearable device.

* * * * *

UNITED STATES PATENT AND TRADEMARK OFFICE
CERTIFICATE OF CORRECTION

PATENT NO. : 10,474,191 B2
APPLICATION NO. : 15/517923
DATED : November 12, 2019
INVENTOR(S) : Jun Ho Park It is certified that error appears in the above-identified patent and that said Letters Patent is hereby corrected as shown below:

In the Specification

In Column 1, Line 38, delete "Objects" and insert -- objects --, therefor.

In Column 6, Line 8, delete "hand," and insert -- band, --, therefor.

In Column 6, Line 35, delete "Object" and insert -- object --, therefor.

In Column 7, Line 2, delete "Motion" and insert -- motion --, therefor.

In Column 7, Line 42, delete "information," and insert -- information. --, therefor.

In Column 8, Line 11, delete "Output" and insert -- output --, therefor.

In Column 8, Line 22, delete "information," and insert -- information. --, therefor.

In Column 8, Line 56, delete "3D" and insert -- 2D --, therefor.

In Column 9, Line 12, delete "information, in" and insert -- information. In --, therefor.

In Column 9, Line 62, delete "Pattern" and insert -- pattern --, therefor.

In Column 13, Line 57, delete "hands." and insert -- bands. --, therefor.

In Column 14, Line 46, delete "A2," and insert -- A2 --, therefor.

In Column 15, Line 51, delete "A+B1," and insert -- A1+B1, --, therefor.

In Column 18, Line 38, delete "of" and insert -- or --, therefor.

Signed and Sealed this
Thirty-first Day of December, 2019

Andrei Iancu
*Director of the United States Patent and Trademark Office*

CERTIFICATE OF CORRECTION (continued)
U.S. Pat. No. 10,474,191 B2

In Column 18, Line 45, delete "hands" and insert -- bands --, therefor.

In Column 18, Line 47, delete "in" and insert -- In --, therefor.

In Column 21, Line 12, after "of" insert -- a --.

In Column 21, Line 15, delete "Mapped" and insert -- mapped --, therefor.

In Column 21, Line 24, after "generates" insert -- a --.

In Column 21, Line 49, delete "Line" and insert -- the --, therefor.

In Column 21, Line 49, delete "model," and insert -- model. --, therefor.

In Column 22, Line 36, delete "finger," and insert -- finger. --, therefor.

In Column 23, Line 42, delete "motion" and insert -- motion, --, therefor.

In Column 25, Line 1, delete "above," and insert -- above. --, therefor.

In Column 25, Line 13, delete "chrome" and insert -- chroma --, therefor.

In Column 26, Line 21, delete "thumb," and insert -- thumb. --, therefor.

In Column 26, Line 42, delete "art" and insert -- an --, therefor.

In Column 26, Line 51, after "worn on" delete "the" and insert -- an --, therefor.

In Column 27, Line 37, delete "image, if" and insert -- image. If --, therefor.

In Column 27, Line 60, delete "device." and insert -- device --, therefor.

In Column 28, Line 41, delete "hack" and insert -- back --, therefor.

In the Claims

In Column 31, Line 16, in Claim 10, after "processors" delete "unit".

In Column 31, Line 30, in Claim 10, delete "more," and insert -- more --, therefor.